(12) United States Patent
Allen et al.

(10) Patent No.: US 8,899,560 B2
(45) Date of Patent: Dec. 2, 2014

(54) SPRINGLESS COMBINATION SHOCK ABSORBER AND SUSPENSION APPARATUS, AND METHOD OF USE

(75) Inventors: Mark M. Allen, Atlanta, GA (US); Nicholas C. Giannopoulos, Canton, GA (US)

(73) Assignee: Elite Suspension Systems, LLC, Atlanta, GA (US)

( * ) Notice: Subject to any disclaimer, the term of this patent is extended or adjusted under 35 U.S.C. 154(b) by 698 days.

(21) Appl. No.: 13/028,348

(22) Filed: Feb. 16, 2011

(65) Prior Publication Data

US 2012/0205843 A1  Aug. 16, 2012

(51) Int. Cl.
| | |
|---|---|
| F16F 5/00 | (2006.01) |
| F16F 9/00 | (2006.01) |
| F16F 9/34 | (2006.01) |
| F16F 9/06 | (2006.01) |
| F16F 9/44 | (2006.01) |
| B60G 15/12 | (2006.01) |

(52) U.S. Cl.
CPC .............. B60G 15/12 (2013.01); F16F 9/063 (2013.01); F16F 9/44 (2013.01)
USPC .................... 267/64.26; 188/313; 188/322.13

(58) Field of Classification Search
CPC .............. F16F 9/06; F16F 9/062; F16F 9/08; F16F 9/088; F16F 9/092; F16F 9/185; F16F 9/5126; F16F 2230/42
USPC ................. 188/313–315, 322.14, 322.15; 267/64.25, 64.26
See application file for complete search history.

(56) References Cited

U.S. PATENT DOCUMENTS

| | | | |
|---|---|---|---|
| 2,308,404 A | | 1/1943 | Thornhill |
| 2,564,790 A | * | 8/1951 | Orloff et al. ............... 267/64.15 |
| 3,033,556 A | * | 5/1962 | Wossner ................... 267/64.19 |
| 3,128,088 A | * | 4/1964 | Paschakarnis ............. 267/64.17 |
| 3,168,302 A | * | 2/1965 | Burris ........................ 267/64.25 |
| 3,363,893 A | | 1/1968 | Goddard |
| 3,519,109 A | * | 7/1970 | Whisler, Jr. .................. 188/269 |
| 3,533,613 A | * | 10/1970 | Bendicsen .................. 267/64.28 |
| 3,547,465 A | | 12/1970 | Hoffman et al. |
| 3,554,387 A | * | 1/1971 | Thornhill et al. ............. 213/223 |
| 3,647,239 A | * | 3/1972 | Katsumori ............. 280/124.154 |
| 3,954,256 A | | 5/1976 | Keijzer et al. |
| 4,284,255 A | | 8/1981 | Masclet et al. |

(Continued)

FOREIGN PATENT DOCUMENTS

| | | |
|---|---|---|
| EP | 0280904 A1 | 9/1988 |
| GB | 571028 | 8/1945 |

(Continued)

*Primary Examiner* — Vishal Sahni
(74) *Attorney, Agent, or Firm* — Withers & Keys, LLC

(57) ABSTRACT

A springless combination shock absorber and suspension apparatus comprising three tubes: An outer tube, a piston tube (inner tube) and a stationary (damping) tube, with a floating piston disposed in the inner piston tube, wherein the floating piston forms two chambers therein, a lower liquid chamber and an upper gas chamber. Fluid dampens shocks by passing through a two-way valve in the outer tube and may be controlled internally by a shim plate positioned over apertures or valve passageways, or, in a separate embodiment, by external adjustment of flow by rotating adjusting plates to open and close the valve passageways. The amount by which the gas chamber is reduced in compression is large enough to generate the high pressures required to produce spring-like forces. This design allows the gas pressure chamber to operate effectively as a spring.

23 Claims, 14 Drawing Sheets

(56) References Cited

U.S. PATENT DOCUMENTS

| | | | |
|---|---|---|---|
| 4,807,860 A * | 2/1989 | Simons | 267/217 |
| 4,824,081 A | 4/1989 | Pauliukonis | |
| 5,028,037 A * | 7/1991 | Wang | 267/64.13 |
| 5,148,896 A | 9/1992 | Ralph | |
| 5,423,402 A | 6/1995 | de Kock | |
| 5,593,007 A | 1/1997 | Siltanen | |
| 6,382,370 B1 | 5/2002 | Girvin | |
| 2002/0121731 A1 | 9/2002 | Miller et al. | |
| 2002/0175035 A1 * | 11/2002 | Achenbach | 188/315 |
| 2006/0054435 A1 | 3/2006 | Yamaguchi | |
| 2006/0091591 A1 | 5/2006 | Robertson | |
| 2009/0014265 A1 | 1/2009 | Michel | |
| 2009/0236807 A1 * | 9/2009 | Wootten et al. | 280/5.514 |

FOREIGN PATENT DOCUMENTS

| | | |
|---|---|---|
| GB | 632497 | 11/1949 |
| GB | 682110 | 11/1952 |
| GB | 972765 | 10/1964 |
| GB | 1095657 | 12/1967 |
| GB | 1331782 | 9/1973 |
| GB | 1334690 | 10/1973 |
| GB | 1478016 | 6/1977 |
| GB | 2076933 | 12/1981 |
| GB | 2122721 | 1/1984 |

\* cited by examiner

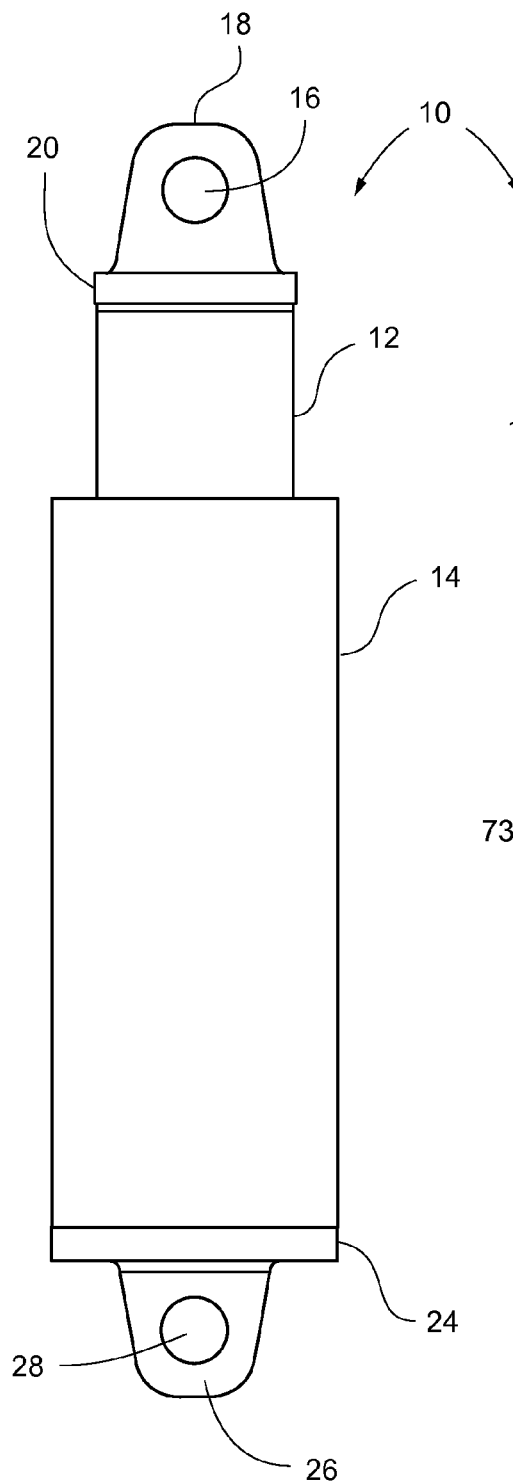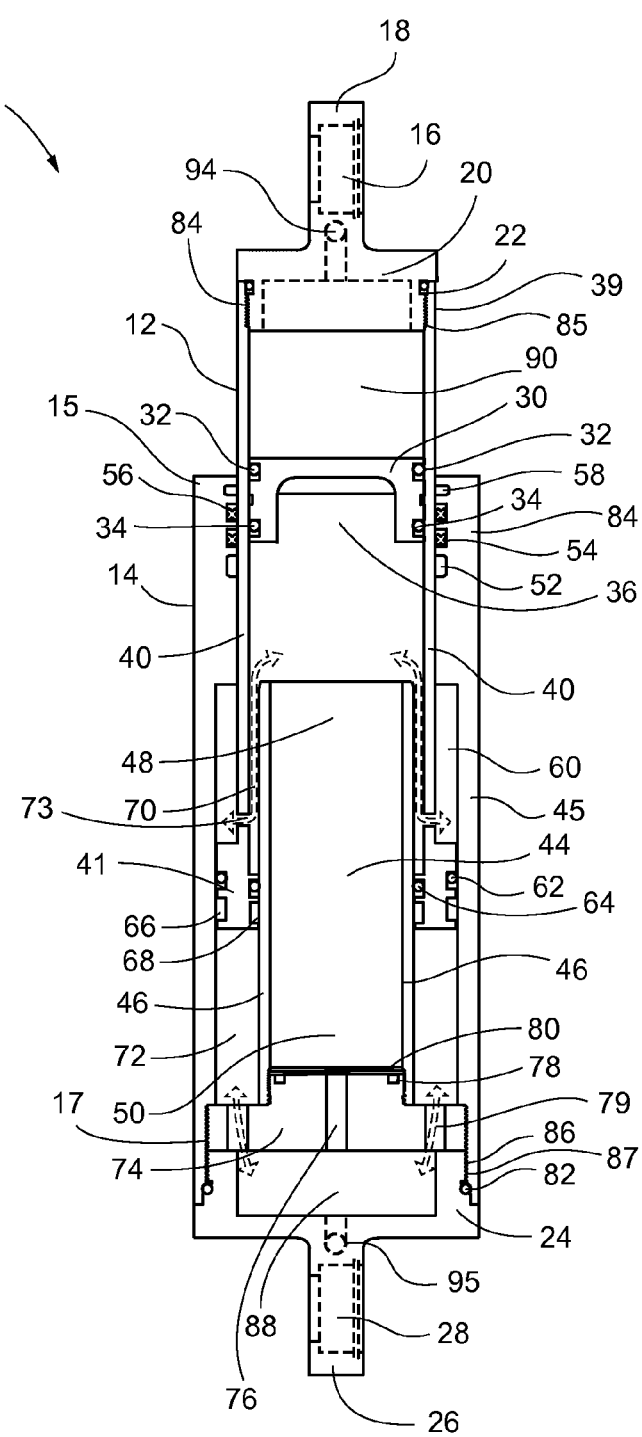
FIG. 1A
FIG. 1B

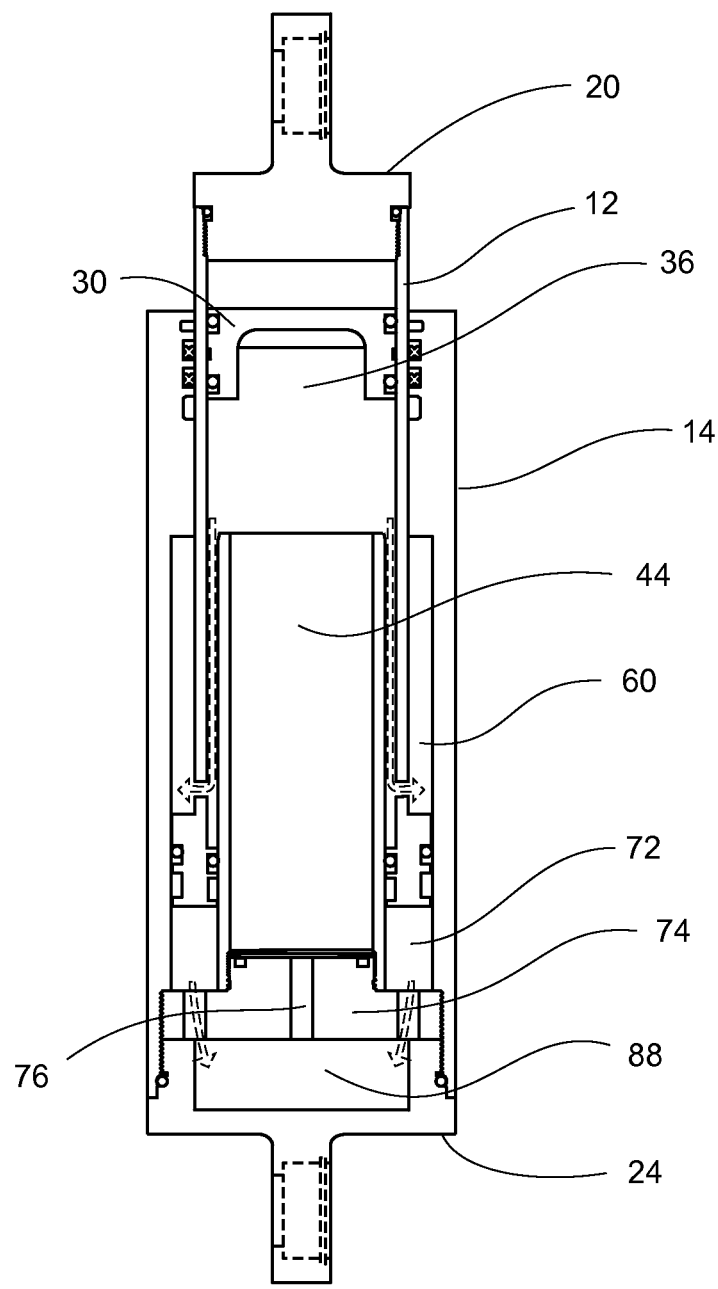
FIG. 5A - COMPRESSED

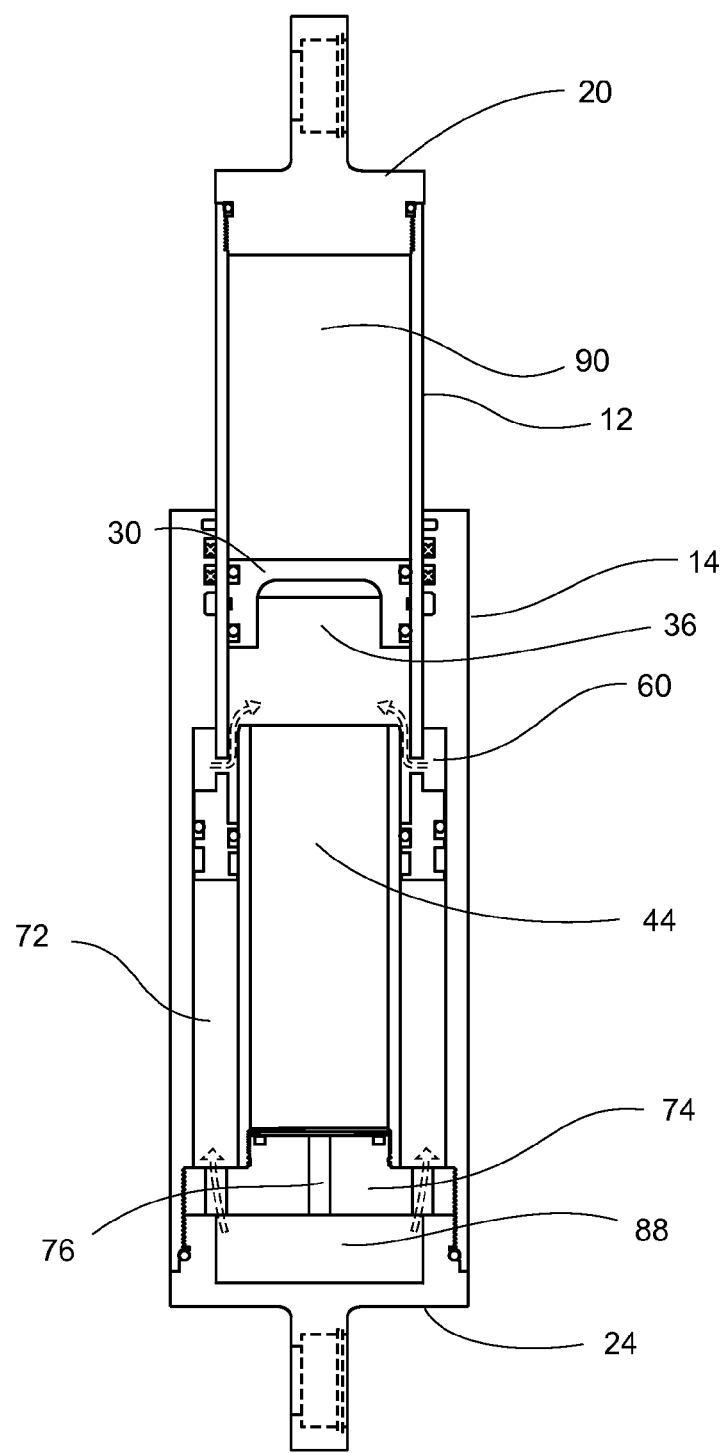
FIG. 5B - EXPANDED

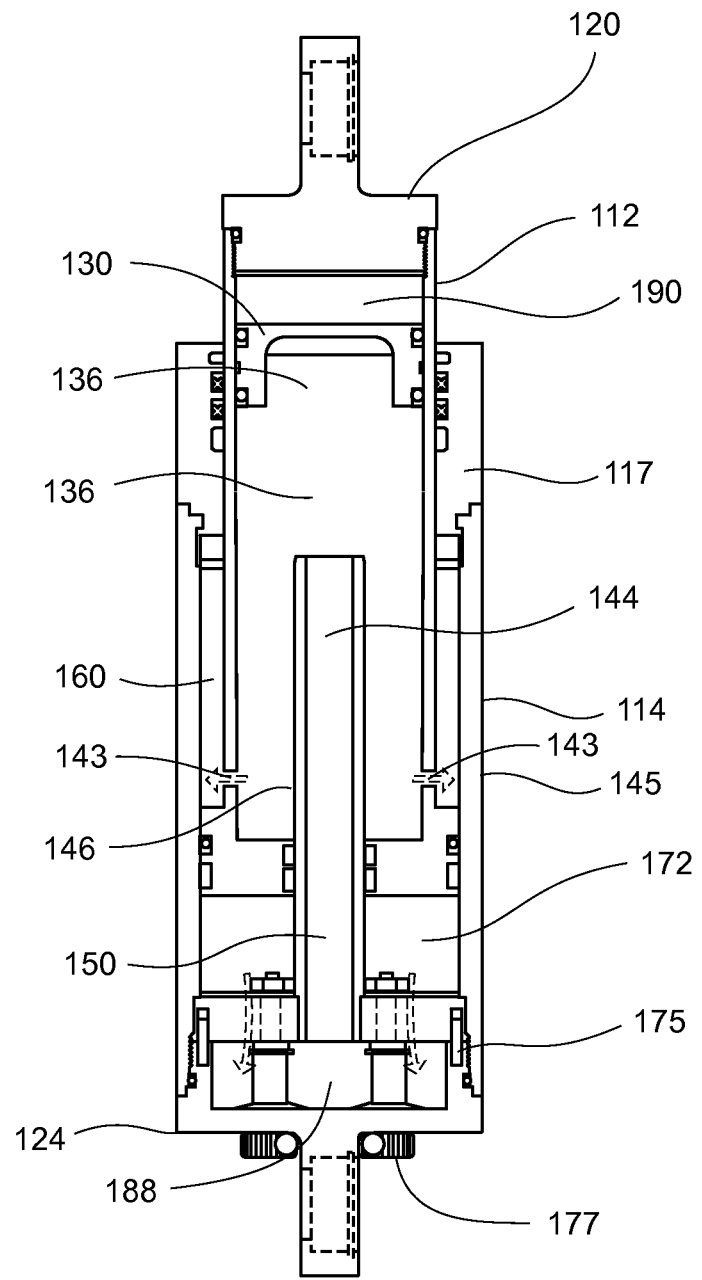
FIG. 6A - COMPRESSED

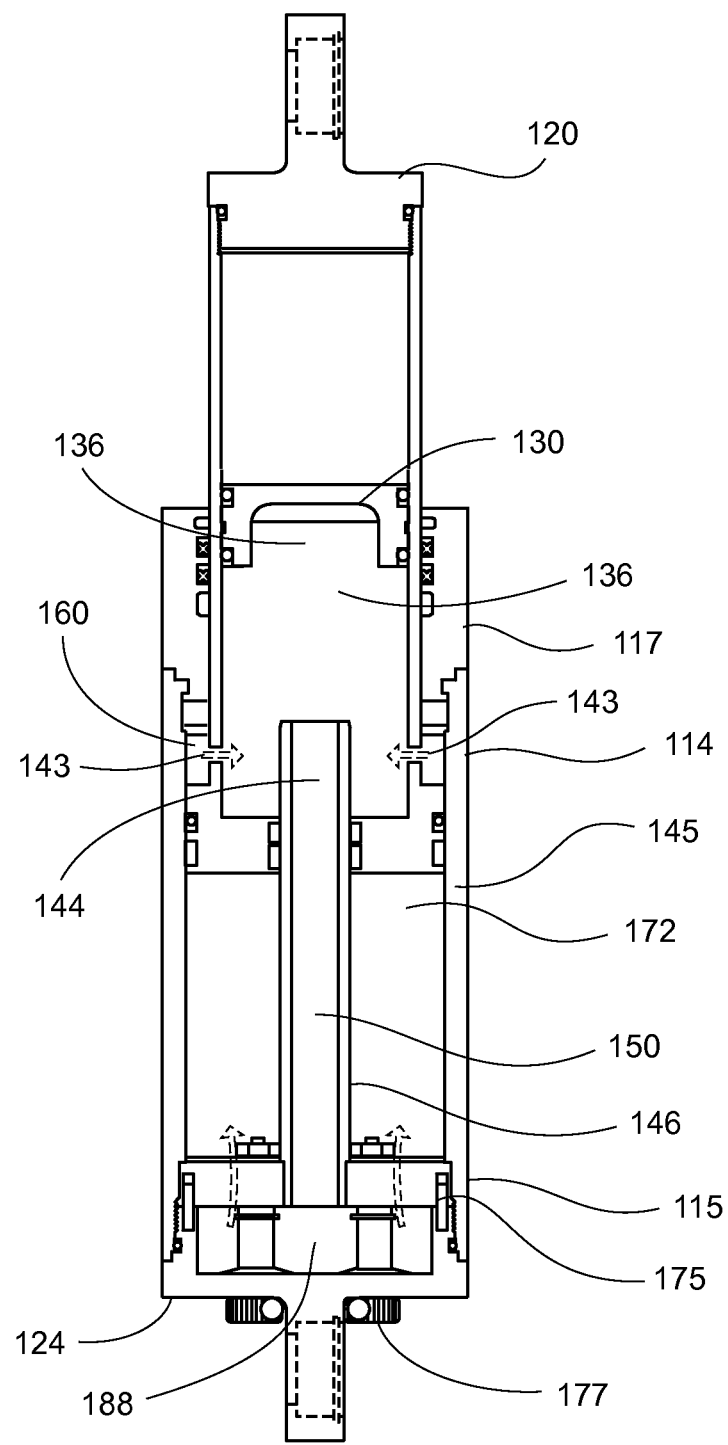
FIG. 6B - EXPANDED

SPRINGLESS COMBINATION SHOCK ABSORBER AND SUSPENSION APPARATUS, AND METHOD OF USE

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to shock absorbers for vehicles, and more specifically to an adjustable shock absorber that does not require a spring to support a vehicle.

2. Description of Related Art

A shock absorber or damper is a mechanical device designed to smooth out or damp shock impulse, and dissipate kinetic energy. Most shock absorbers (dampers) are utilized with external springs (coils).

Various devices for absorbing shock for vehicles have been attempted utilizing a piston rod moving up and down in a cylinder to provide oscillation dampening ("twin-tube" configuration) therewithin to provide smoothing of shocks that would otherwise be passed to the vehicle. Other shock absorbers utilize a floating piston which accommodates the volume of the piston rod as it moves in an out of a cylinder ("mono-tube" configuration). Such devices typically rely upon springs, most typically coil springs disposed around the body of the shock absorber, or in another location of the suspension, to carry the load of the vehicle. In one prior device a spring is required to internally control a valving operation, wherein fluid within the body of the shock absorber flows in an opposing direction to the motion of the floating piston back through a two-way valve, as gas in the gas chamber decompresses or compresses in response to external circumstances, and pressure in the fluid chamber lessens or increases to restore equilibrium within the system. However, the load is only partially sustained by the compressed gas therewithin and thus the device is effectively non-load-bearing without a spring working in concert.

It is further desirable that a shock absorber be capable of being adjusted to provide the desired "ride" characteristics. This is also important in making a shock absorber that can be adapted to a variety of vehicles. One device approaches this problem by teaching a shock absorber with an adjustable lock-out valve and two stage flow restriction. This suspension/shock combination device works in part by having fluid flow from a fluid chamber into another chamber during the compression and rebound strokes of a piston. The fluid flow is controlled through valves that can be manipulated externally to open and close on demand. By adjusting the opened and closed positions of the valves (or an intermediate position between opened and closed) fluid flow could be increased or decreased and therefore shock absorption characteristics are affected. This device is a damper only for lightweight vehicles such as bicycles. Further, this device does not support the vehicle's weight.

Yet another device teaches pneumatic connections for vehicle suspensions, but comprises a damper only. This device includes a piston inside a housing, wherein separate first and second chambers are also disposed. The piston includes at least one aperture, which regulates the flow of dampening fluid between the two chambers, having an affiliated actuator attached. Upon activation of the actuator, the piston aperture will be obstructed, thereby reducing fluid flow immediately. Deactivation of the actuator will once again permit free fluid flow. Further a frit restricts flow of fluid to assist in dampening shock impact.

Another device teaches a telescopic suspension device for vehicles having two liquid chambers interconnected by a conduit in which a valve unit is interposed. This device has a valve-within-tube structure. Flow of fluid is directly between outer tube and piston (or inner) tube. There is no stationary tube. Further, the valve body is located on the piston tube and thus moves with the piston tube. However, this device lacks adjustment control, although it does provide springless operation.

In another design, the damping tube is threaded to the bottom of the outer tube and the valve is externally threaded on the damping tube. This device requires that the damper tube have holes therein, and further requires a spring to support the vehicle. As an option, this device comprises a port that can be drilled on the outside of the damping tube, to fill same with gas so in extension the gas creates a negative biasing effect. However, no biasing effect is created in compression.

Most dampers in the market (either twin tube configuration or mono-tube configuration) have a gas chamber area, and, in the case of the mono-tube configuration, a floating piston. However, the gas chamber's purpose is not to provide spring action but is rather a place to accommodate the extra oil displaced by the piston rod as it moves down (compression). In another words, the force created in the gas chamber is not enough to sustain the vehicle's weight; hence, the need for an external spring for such dampers. The flow valve located at the end of the piston rod regulates the flow, hence, the damping.

Therefore, it is readily apparent that there is a need for a shock absorber that can provide the necessary operation range of damping motion without requiring that a spring be utilized in combination to support the load of a vehicle, and that further provides a biasing effect in both compression and extension.

BRIEF SUMMARY OF THE INVENTION

Briefly described, in a preferred embodiment, the present invention overcomes the above-mentioned disadvantages and meets the recognized need for such a device by providing a springless combination shock absorber and suspension apparatus, and method of use, that eliminates the need for a coil spring, wherein a floating piston device is utilized to regulate gas pressure, thus providing the necessary load sustainability, wherein the piston device is stationed between two principal chambers, a lower chamber filled with fluid and an upper chamber with air. Fluid is able to pass into and out of the working space through a two-way valve and fluid ways that allow fluid flow to compensate for volume change within segments of the fluid working space. Fluid flow through the two-way valve may be controlled internally by selection of appropriate shim plates which are positioned over apertures or valve passageways for flow of oil.

The springless combination shock absorber and suspension apparatus consists of three tubes: An outer tube, a piston tube with a piston head or ring at the end (inner tube) and a stationary (damping tube). It will be recognized by those skilled in the art that the piston head could be machined into the piston tube, or, alternately, threaded onto the piston tube (or otherwise secured thereto) without departing from the spirit of the present invention. The area above the floating piston, which is located inside the piston tube, is filled with gas. The area below the floating piston, including the stationary tube and the outer tube above and below the piston tube head (which divides the outer tube in two chambers), is filled with oil. As the piston tube compresses, oil flows from the outer tube through a) the valve (located inside the stationary tube for the preferred embodiment), or b) outside the stationary tube (for the first alternate embodiment) and up the stationary tube. Part of the volume of the oil displaced plus the volume of the stationary tube (acting as a solid rod) push the floating piston upwards, which in turn increases the gas pressure in the chamber above the floating piston, thus providing the resistance necessary to absorb the given force (shock). The amount by which the gas chamber is reduced is large enough (because of the shock's geometry) to generate the high pressures required to produce spring-like forces. This design allows the gas pressure chamber to operate effectively as a spring. The flow valve provides the damping by regulating the flow of oil therethrough.

A first alternative embodiment includes an additional passageway via a tube through the center of the one-way valves that provides for external adjustment of flow by rotationally adjusting football-shaped plates to open and close the valve passageways. Another alternative embodiment of the invention provides additional optional valving by addition of either one external pipe, or two external pipes. In the two pipe system, each pipe will have a one-way valve, that is, one pipe will control fluid flow in one direction and the other pipe controls fluid flow in the opposite direction. In the one pipe system, a two-way valve within the external pipe controls fluid flow in both directions. An additional alternate embodiment comprises a side chamber with floating piston and air and fluid sections, the latter being in fluid communication with the bottom oil chamber within the shock. Therefore, the unit serves as an effective spring and a damper all in one. No external spring (coil) is needed. Further, both embodiments can optionally have an additional gas chamber in communication with the top chamber containing gas.

According to its major aspects and broadly stated, the present invention in its preferred form is a springless combination shock absorber and suspension apparatus having an inner tubular section with a first fluid chamber and a second fluid chamber therewithin. The first fluid chamber contains gas and the second fluid chamber contains oil. A floating piston is disposed within the inner tubular section between the first fluid chamber and the second fluid chamber. The springless combination shock absorber further comprises a stationary tubular section having a third fluid chamber therewithin, wherein the third fluid chamber is in fluid communication with the fourth fluid chamber via a valve block. The inner tubular section is slidably disposed within an outer tubular section having a fourth fluid chamber therewithin and the stationary tubular section has the valve block fixedly secured thereto, wherein the valve block comprises a two-way valve.

In the preferred embodiment, the valve block provides fluid communication between the third and fourth fluid chambers. The rate of flow through each valve in the valve block is selected prior to assembly by installation of shim plates of chosen thickness which will deflect with the passage of fluid through the valve block as the fluid exits the valve block, but will prevent the flow of fluid in the reverse direction which is controlled by a separate, similar valve that will permit passage in the reverse direction.

The springless combination shock absorber further comprises an upper side fluid chamber and a lower side fluid chamber. In the preferred embodiment, the upper side fluid chamber is in direct fluid communication with the second fluid chamber and the lower side fluid chamber is in direct fluid communication with the fourth fluid chamber. In the first alternate embodiment, the upper side fluid chamber remains in direct fluid communication with the second fluid chamber, while the lower side fluid chamber is in fluid communication with the fourth fluid chamber via the valve block.

In the alternate embodiment, the springless combination shock absorber and suspension apparatus is externally adjustable via rotational control of the two-way valve which selectively controls flow in opposing directions through the valve block.

In another alternate embodiment, the springless combination shock absorber and suspension apparatus comprises a bypass tube or tubes between the upper side fluid chamber and the lower side fluid chamber.

In still another alternate embodiment, the springless combination shock absorber and suspension apparatus comprises an external fluid chamber in fluid communication with the fourth fluid chamber containing oil, wherein the external fluid chamber has a liquid fluid section separated from a gaseous fluid section by a floating piston, or, alternatively, the external gas-containing chamber may be in communication with the first fluid chamber containing gas and have a controllable piston therewithin to adjust the gas pressure within the shock absorber.

In yet another alternate embodiment, the springless combination shock absorber and suspension apparatus comprises an extended gas-containing chamber within the floating piston.

More specifically, the present invention is a springless combination shock absorber and suspension apparatus, and method of use thereof, wherein the shock absorber comprises an inner tube, an outer tube, a floating piston, a stationary tube and a valve block disposed between the outer tube and the stationary tube. The inner tube comprises a side wall, a first end and a head. The inner tube is threadedly secured to a top eyelet having a gas nipple therein. The head slidably seals to the outer tube and slidably seals to the stationary tube. The head separates an upper side fluid chamber and a lower side fluid chamber, the former being formed between the inner tube and the outer tube, and the latter being enclosed by the head, the stationary tube, the valve block and the outer tube.

The valve comprises passageways, first apertures and second apertures, wherein a shim plate is disposed on and secured to the valve with a spring washer to provide pressure of the shim plate against the valve when the spring washer and shim plate are secured to the valve via a fastener. The shim plate has openings therein to permit flow of fluid through valve via the apertures, thereby permitting regulated adjustment of flow through valve. The stationary tube is threadedly secured to the valve block, thereby fixing the stationary tube to the valve block.

When shock absorber is assembled, a first fluid chamber is formed between the floating piston, the inner tube and the top eyelet, wherein the first fluid chamber is subsequently filled with nitrogen gas. A second fluid chamber is formed between the floating piston and the inner tube, wherein the second fluid chamber is filled with oil. The second fluid chamber extends into a side extension chamber, and into the stationary tube forming therewithin a third fluid chamber. Once assembled, gas is introduced into the first chamber to a pressure adequate to achieve a selected vehicle ride height.

When the shock absorber is compressed by impact forces, the floating piston moves toward the top eyelet, thereby compressing the nitrogen gas in the first fluid chamber and dampening the shock of the impact by controlling oil flow through the valve(s). When the shock absorber relaxes after removal of the impacting forces, or when the vehicle moves upward, the inner tube and outer tube move apart and the nitrogen gas expands to fill its chamber.

Accordingly, a feature and advantage of the present invention is its ability to smooth out or damp shock impulse, and dissipate kinetic energy.

Another feature and advantage of the present invention is that it is modular in construction, allowing different sizes/lengths to be readily adapted to top and bottom portions, to thereby lengthen or shorten the shock absorber depending on application requirements.

Yet another feature and advantage of the present invention is its ability to be adjusted by external controls.

Yet still another feature and advantage of the present invention is that it does not require a separate spring to support the vehicle.

A further feature and advantage of the present invention is its ability to provide a larger external fluid tank with a floating piston therein for selected applications requiring a greater volume of gas and/or oil.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which:

FIG. 1A is a front view of a shock absorber according to a preferred embodiment;

FIG. 1B is a cross-sectional view of the shock absorber of FIG. 1A;

FIG. 5A is a cross-sectional view of the shock absorber of FIGS. 1A/1B shown compressed from shock impact;

FIG. 5B is a cross-sectional view of the shock absorber of FIGS. 1A/1B shown expanded after recovery from shock impact;

FIG. 6A is a cross-sectional view of the shock absorber of FIGS. 2A/2B shown compressed from shock impact;

FIG. 6B is a cross-sectional view of the shock absorber of FIGS. 2A/2B shown expanded after recovery from shock impact;

Figures 2A, 2B:
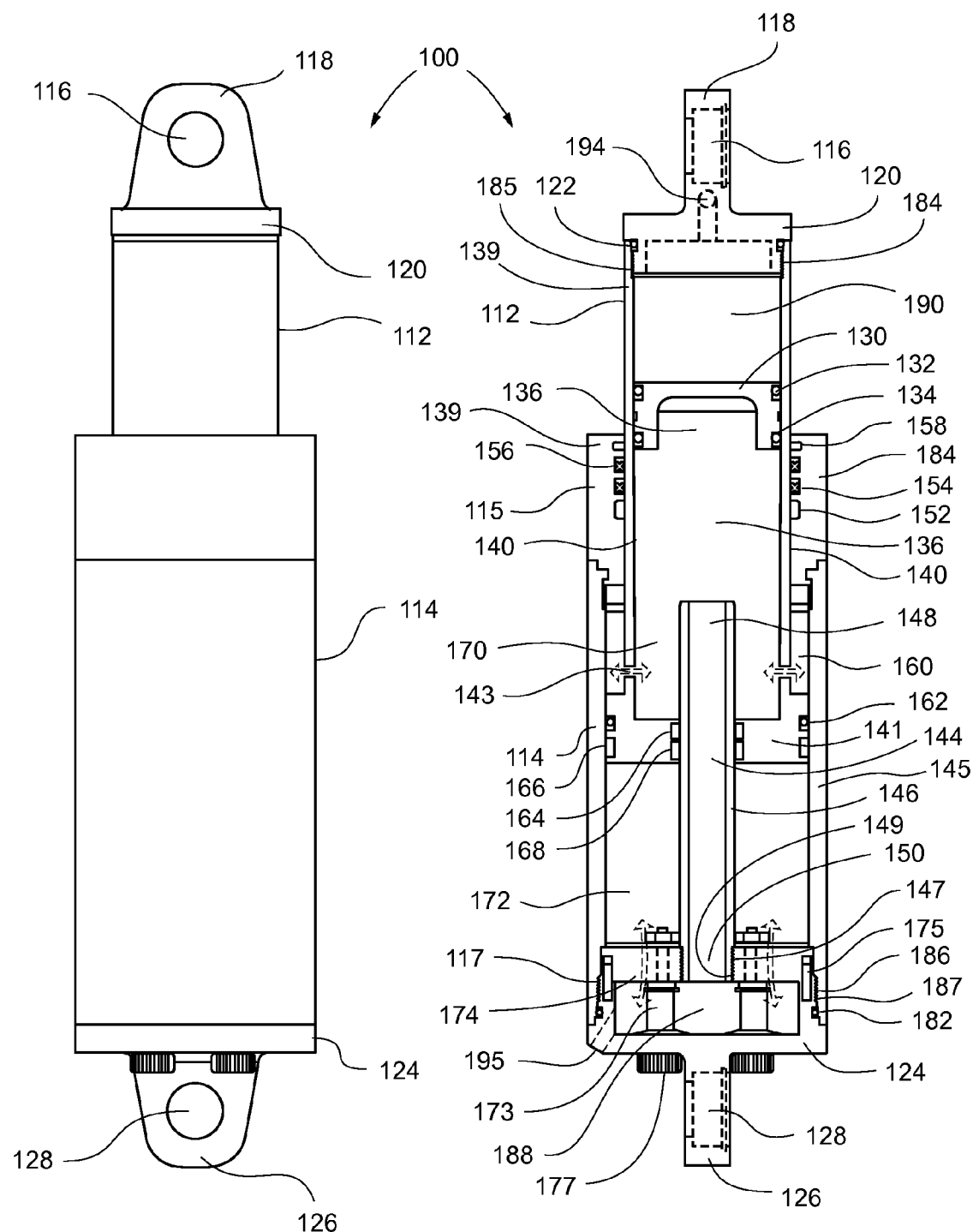
FIG. 2A is a front view of a shock absorber according to an alternate embodiment.
FIG. 2B is a cross-sectional view of the shock absorber of FIG. 2A.
Figure 3:
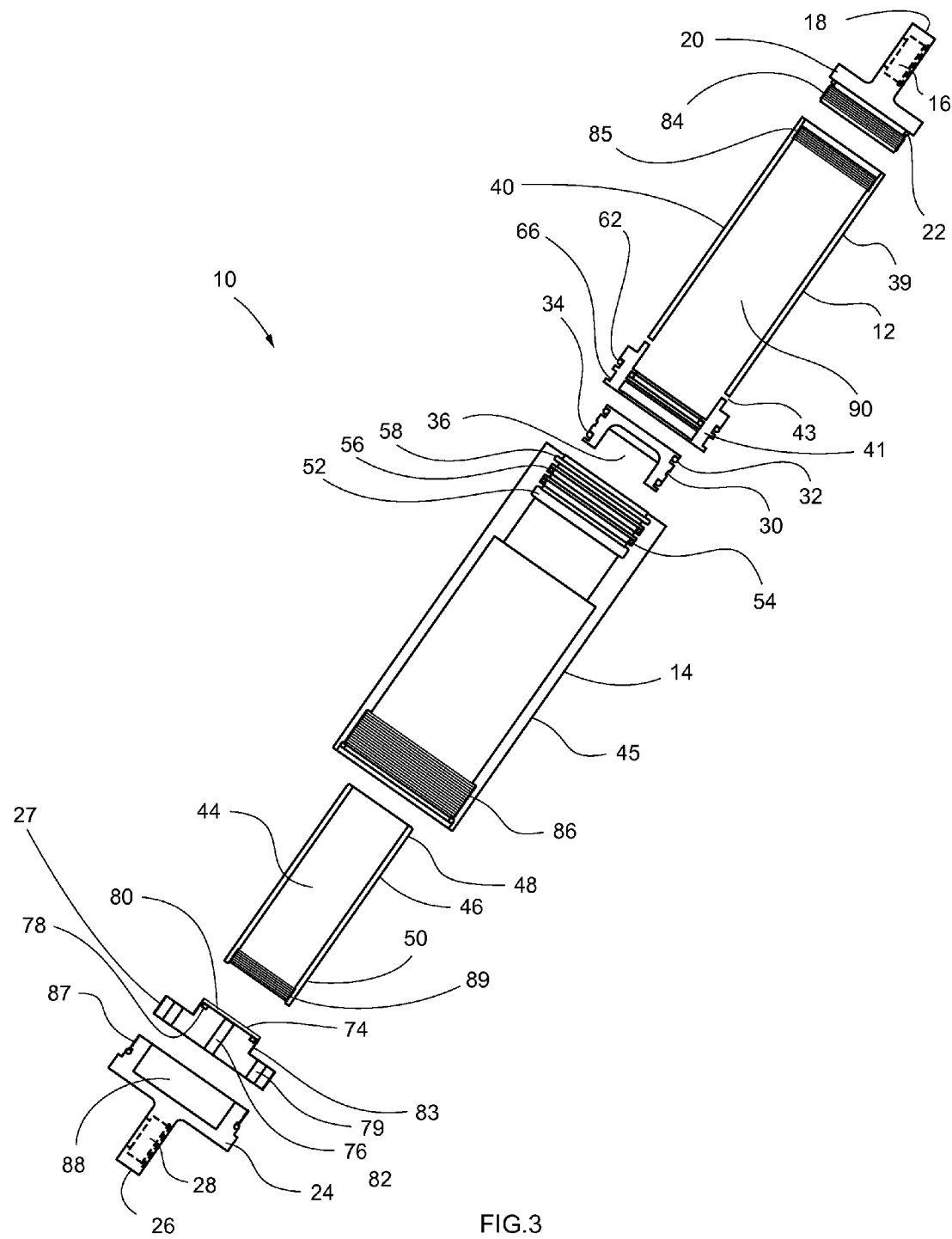
FIG. 3 is an exploded view of the shock absorber of FIGS. 1A/1B.
Figure 4:
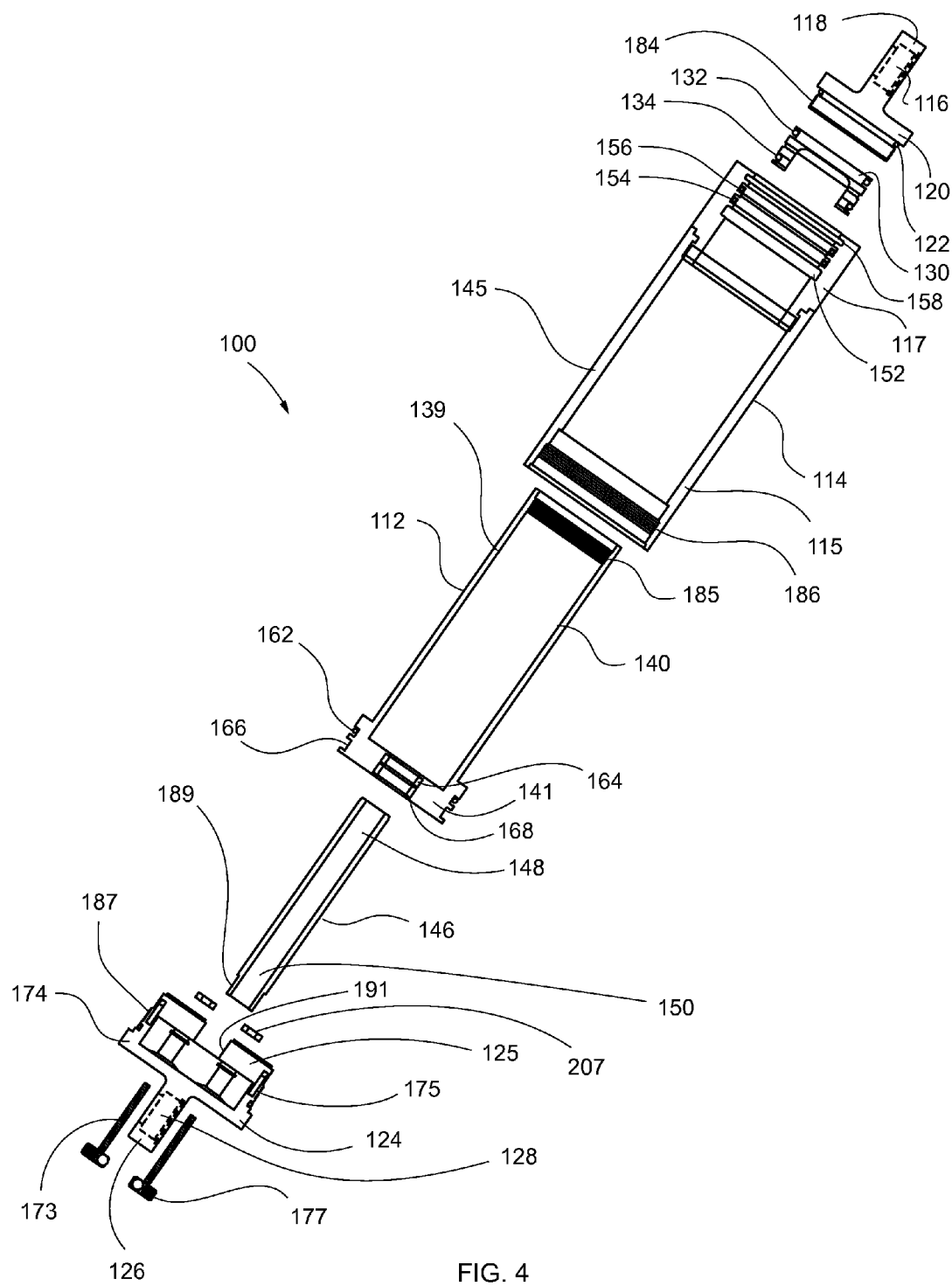
FIG. 4 is an exploded view of the shock absorber of FIGS. 2A/2B.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1A-11, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1A, 1B, 3, 5A, 5B, 7A and 7B, the preferred embodiment comprises shock absorber 10, wherein shock absorber 10 comprises inner tube 12, top eyelet 20, outer tube 14, bottom eyelet 24, floating piston 30, valve block 74 and stationary tube 46. Top eyelet 20 comprises top mount 18 and top bolt throughhole 16, wherein top bolt throughhole 16 is disposed in top mount 18, and wherein top bolt throughhole 16 is adapted to receive a mounting bolt (not shown) for securing shock absorber 10 to the chassis (not shown) of a vehicle, as is known in the art. Top eyelet 20 further comprises top eyelet threads 84 and gas filling nipple receiver 94.

Inner tube 12 comprises side wall 40, first end 39 and head 41. First end 39 comprises inner tube threads 85, wherein inner tube threads 85 cooperatively engage with top eyelet threads 84, and wherein top seal 22 is disposed between top eyelet 20 and inner tube 12, thereby hermetically sealing top eyelet 20 to inner tube 12. Head 41 comprises seals 62, 64, 66, 68, wherein seals 62, 66 are disposed outward from head 41 in contact with outer tube 14, slidably sealing against outer tube 14, and wherein seals 64, 68 are disposed inward from head 41, and are disposed in contact with stationary tube 46, slidably sealing against stationary tube 46. Floating piston 30 is disposed within inner tube 12, wherein floating piston 30 separates first fluid chamber 90 (gas) from second fluid chamber 36 (oil). Head 41 separates upper side fluid chamber 60 and lower side fluid chamber 72, the former being formed between side wall 40 and outer tube 14 and the latter being enclosed by head 41, stationary tube 46, valve block 74 and outer tube 14. Inner tube 12 comprises piston tube holes 43 providing fluid communication between second fluid chamber 36 and upper side fluid chamber 60.

As shock absorber 10 is compressed, fluid passes from second fluid chamber 36 into upper side fluid chamber 60 via piston tube holes 43. Concurrently, fluid passes from lower side fluid chamber 72 into fourth fluid chamber 88. Fluid may subsequently pass from fourth fluid chamber 88 through valve block 74 into third fluid chamber 44 within stationary tube 46 and on into second fluid chamber 36.

Stationary tube 46 is of diameter selected to provide a desired flow between second and fourth fluid chambers 36 and 88 via third fluid chamber 44, and a desired pressure increase/decrease as stationary tube 46 enters/withdraws from second fluid chamber 36, wherein as stationary tube 46 enters second fluid chamber 36, floating piston 30 rises within inner tube 12, thereby increasing the pressure in first fluid chamber 90, and vice versa.

As shock absorber 10 expands, fluid passes from upper side fluid chamber 60 into second fluid chamber 36 via piston tube holes 43, flows into third fluid chamber 44, subsequently passing through valve block 74 into fourth fluid chamber 88 and finally into lower side fluid chamber 72 via passageways 79.

Bottom eyelet 24 comprises bottom eyelet threads 87, bleed nipple 95 and bottom mount 26, wherein bottom mount 26 has disposed therethrough bottom bolt throughhole 28, and wherein bottom bolt throughhole 28 is adapted to receive a mounting bolt (not shown) for securing shock absorber 10 to the suspension (not shown) of a vehicle, as is known in the art.

Outer tube 14 comprises side wall 45, first end 15 and second end 17, wherein first end 15 comprises seals 52, 54, 56 and 58, and wherein second end 17 comprises outer tube threads 86, and wherein outer tube threads 86 cooperatively engage bottom eyelet threads 87, and wherein bottom seal 82 is disposed between bottom eyelet 24 and outer tube 14, thereby hermetically sealing bottom eyelet 24 to outer tube 14.

Turning now more particularly to FIGS. 1B, 3, 5A, 5B, 7A and 7B, valve block 74 comprises passageways 79 and valve central threads 83, wherein valve central threads 83 cooperatively engage stationary tube threads 89. Plate 80 is disposed on and secured to valve block 74 via fastener 76. Valve block 74 comprises outer threads 27, wherein outer threads 27 secure valve block 74 to bottom eyelet 24 by threaded engagement of outer threads 27 and bottom eyelet threads 87 with outer tube threads 86, and wherein fourth fluid chamber 88 is thereby formed between valve block 74 and bottom eyelet 24.

Valve block 74 (best shown in FIGS. 7A and 7B) comprises fastener 76, top 69, bottom 71, optional passageways 79, optional openings 101, first throughholes 65 and second throughholes 67, wherein first throughholes 65 allow flow through valve block 74 during expansion of shock absorber 10, and wherein second throughholes 67 allow flow through valve block 74 during compression of shock absorber 10.

Optional passageways 79 and openings 101 provide unrestricted flow to shim plate 80 during compression and unrestricted flow back to chamber 72 during extension. Throughholes 65 channel flow to shim plate 63 in extension and throughholes 67 channel flow to plate 80 in compression.

During expansion, fluid flowing through valve block 74 from third fluid chamber 44 to fourth fluid chamber 88 enters first throughholes 65 via first top orifices 75 and exits via first bottom orifices 81. However, flow is restricted by one or more lower shim plates 63, wherein lower shim plates 63 are secured against valve block 74 via fastener 76. As fluid is forced through first throughholes 65, lower shim plates 63 flex to permit fluid to pass. The force acting on shim plates 63 by the pressure produced will make shim plates 63 flex and allow fluid to pass through. The amount of flexing is determined by the number and thickness of each shim plate 63.

During compression, fluid flowing through valve block 74 from fourth fluid chamber 88 to third fluid chamber 44 enters second throughholes 67 via second bottom orifices 77 and exits via second top orifices 73. However, flow is restricted by one or more plates 80, selectively including plates 103, 105, wherein plates 80 are secured against valve block 74 via fastener 76. As fluid is forced through second throughholes 67, plates 80 flex to permit fluid to pass. The force acting on shim plates 63 by the pressure produced will make shim plates 63 flex and allow fluid to pass through. The amount of flexing is determined by the number and thickness of each shim plate 63.

By addition of shim plates 103, 105, additional strengthening of plate 80 is achieved to thereby provide adjustment of flow resistance by an appropriate selection of additional shim plates 103, 105. By varying the stiffness of each plate 80, 103, 105, and/or by changing the diameter and/or thickness, the flow resistance is tailored to cover a wide range of pressure values during shock operation. It will be recognized by those skilled in the art that, similarly, for lower shim plates 63, adjustment of flow resistance is selectively adjusted by additional, stiffer, or larger diameter shim plates 63.

Stationary tube 46 comprises first end 48, second end 50 and stationary tube threads 89 disposed at second end 50, wherein stationary tube threads 89 cooperatively engage valve central threads 83, thereby securing stationary tube 46 to valve block 74, wherein second end 50 is disposed proximate valve block 74.

Floating piston 30 comprises seals 32, 34, wherein seals 32, 34 are disposed in contact with inside of inner tube 12, thereby hermetically slidably sealing floating piston 30 to inner tube 12.

When shock absorber 10 is assembled, first fluid chamber 90 is formed between floating piston 30, inner tube 12 and top eyelet 20, wherein first fluid chamber 90 is subsequently filled with gas, such as, for exemplary purposes only, nitrogen, via a nipple disposed in nipple receiver 94 prior to attachment of shock absorber 10 to a selected vehicle. It will be recognized by those skilled in the art that gas pressure can similarly be adjusted once shock absorber 10 is installed on a vehicle. Second fluid chamber 36 is formed between floating piston 30 and inner tube 12, wherein second fluid chamber 36 is filled during assembly with a suitable shock absorber fluid, such as, for exemplary purposes only, oil. Second fluid chamber 36 extends into extension chambers 70, and into stationary tube 46 forming third fluid chamber 44 therewithin.

In use, shock absorber 10 is assembled with oil in second, third and fourth fluid chambers, 36, 44, and 88, respectively, and gas is introduced into first fluid chamber 90, and shock absorber 10 is installed on a vehicle. Gas pressure may subsequently be adjusted within first fluid chamber 90 to a pressure adequate to achieve a selected vehicle ride height.

When the vehicle travels over a rough surface causing an impact to the wheels and suspension, such impact compresses shock absorber 10, wherein outer tube 14 is driven toward inner tube 12, thereby shortening shock absorber 10 (best shown in FIG. 5A). As shock absorber 10 shortens in length, fluid from lower side fluid chamber 72 is forced through passageways 79 into fourth fluid chamber 88. Since fourth fluid chamber 88 is of fixed dimension, fluid is subsequently forced through valve block 74 into third fluid chamber 44 and ultimately into contiguous second fluid chamber 36. The increased volume of fluid in second fluid chamber 36 causes floating piston 30 to move toward top eyelet 20, thereby compressing gas in first fluid chamber 90 and dampening the shock of the impact (best shown in FIG. 5A).

When shock absorber 10 relaxes after removal of the impacting forces, or in any such case that the vehicle moves upward or a dip in the road is encountered, inner tube 12 and outer tube 14 move apart (best shown in FIG. 5B).

Figure 5C:
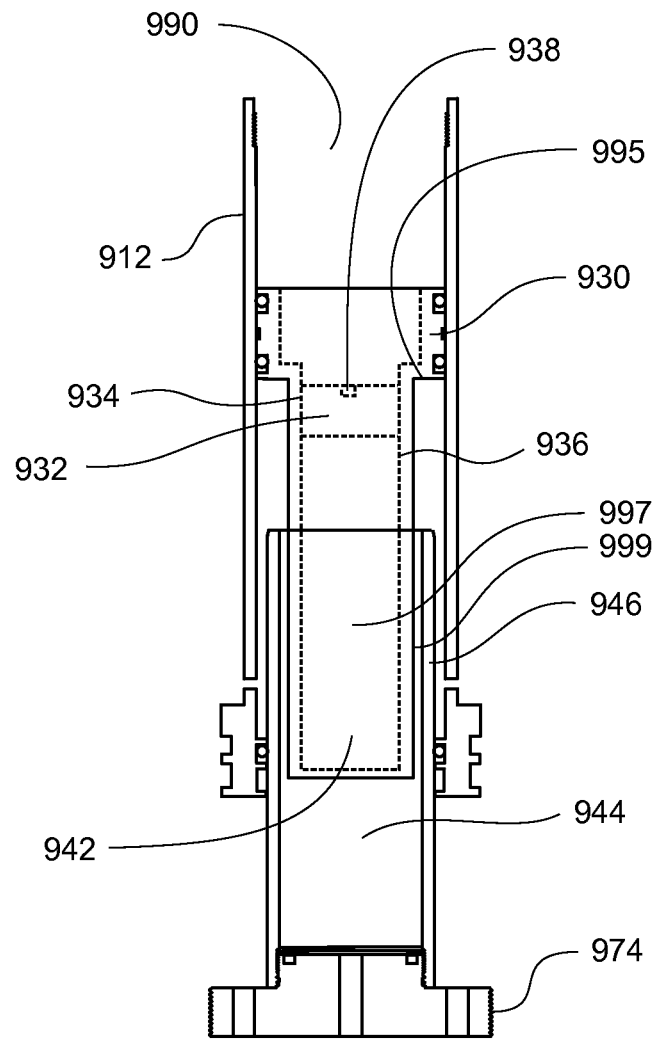
FIG. 5C is a cross-sectional view showing an extended floating piston according to an alternate embodiment.
Figure 7A:
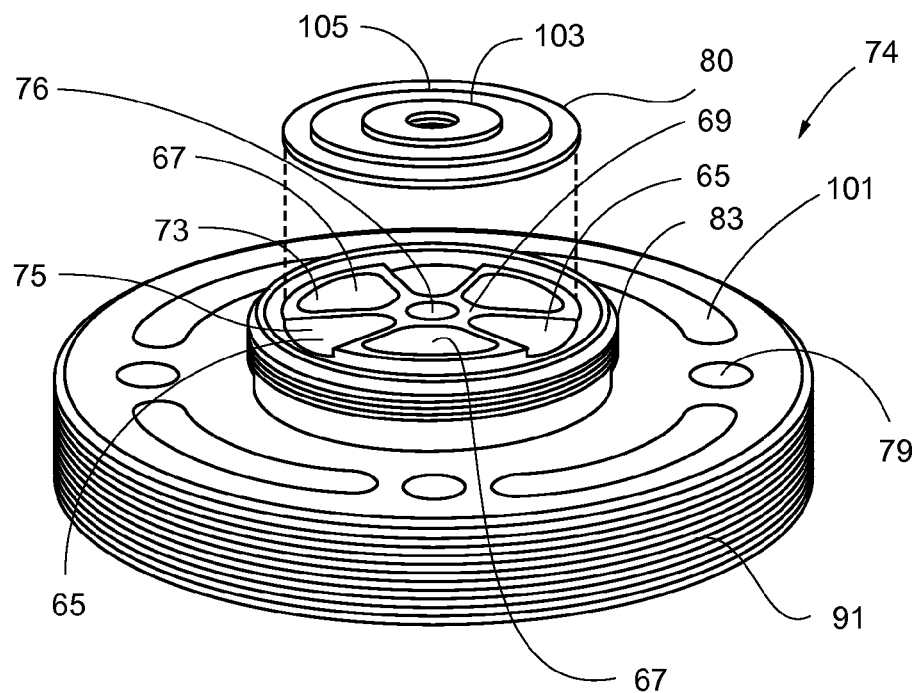
FIG. 7A is a top perspective view of an internally-adjusted valve block according to the preferred embodiment of FIGS. 1A/1B.
Figure 7B:
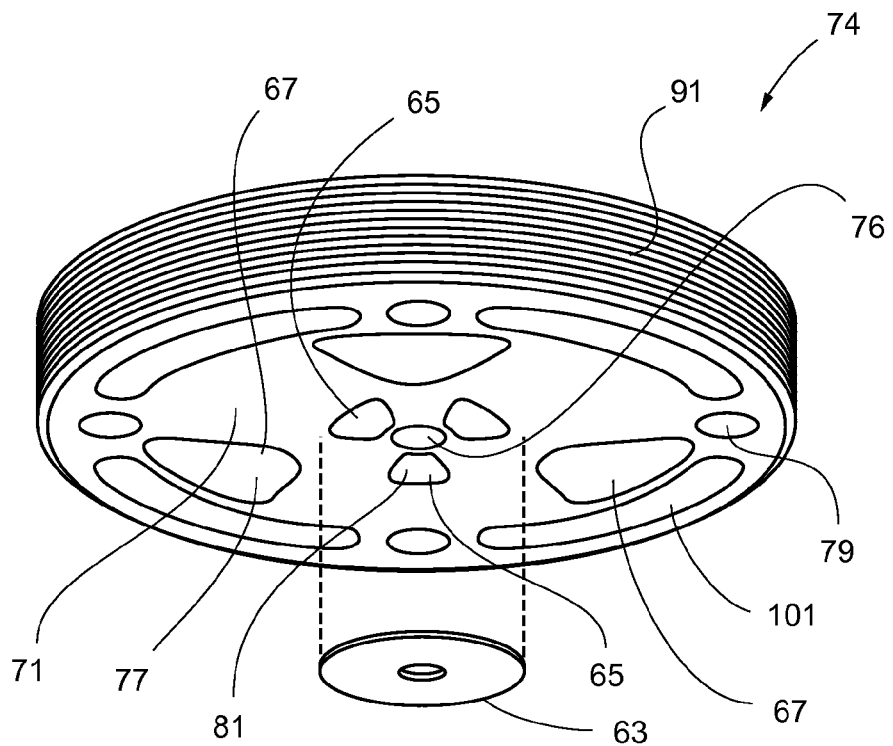
FIG. 7B is a bottom perspective view of an internally-adjusted valve block according to the preferred embodiment of FIGS. 1A/1B.

In an alternate embodiment of shock absorber 10, as depicted in FIG. 5C, floating piston 930 disposed within inner tube 912 comprises piston head 995 and piston extension 999, wherein piston extension 999 comprises gas space expansion chamber 997, and wherein piston extension 999 extends from piston head 995 into third fluid chamber 944 within stationary tube 946, and wherein stationary tube 946 is secured to valve block 974.

Modifying floating piston 930 by adding expansion chamber 997, two variables (as described in example I) and their effect in the operation of the shock are changed. First is the available gas volume which now includes not only the area above the floating piston but also the area inside expansion chamber 997. Second, since expansion chamber 997 is now physically located inside stationary tube 946, it has replaced the volume of oil previously inside stationary tube 946 in third fluid chamber 944 above valve block 974. Therefore, as piston tube 912 moves downwards, less oil volume is displaced, and since gas chamber 990 is now larger by addition of expansion chamber 997, less pressure is produced. For those skilled in the art, it will be apparent that by altering the diameter (rod effect) and the length (gas volume area) of expansion tube 936, a softer spring rate and initial ride height can be achieved, compared to shock absorber 10 of the preferred embodiment In a variation of this alternate embodiment, also depicted in FIG. 5C, plug 932 subdivides expansion chamber 997 from first fluid chamber 990 by forming lower expansion section 942, wherein plug 932 having external threads 934 is threadedly engaged with threads 936 on the inside of expansion chamber 997, wherein plug 932 is rotated, via, for exemplary purposes only, an Allen wrench inset, to increase/decrease lower expansion section 942 while correspondingly decreasing/increasing the volume of first fluid chamber 990.

In this variation, plug 932 may selectively be installed within piston extension 999, wherein plug 932 comprises drive socket 938 and threads 934, and wherein piston extension 999 comprises internal threads 936. Threads 934 and internal threads 936 cooperatively engage to threadedly seal plug 932 to piston extension 999, thereby isolating extension fluid chamber 942 from first fluid chamber 990. Extension fluid chamber 942 can selectively be reduced/enlarged in volume by screwing in/screwing out plug 932. Optionally, oil or gas could be selected to fill extension fluid chamber 942.

Referring now to FIGS. 2A, 2B, 4, 6A, 6B and 8, illustrated therein is a first alternate embodiment of shock absorber 10, wherein the alternate embodiment of FIGS. 2A, 2B, 4, 6A, 6B and 8 is substantially equivalent in form and function to that of the preferred embodiment detailed and illustrated in FIGS. 1A, 1B, 3, 5A, 5B and 7 except as hereinafter specifically referenced. Specifically, the embodiment of FIGS. 2A, 2B, 4, 6A, 6B and 8 comprises shock absorber 100, wherein shock absorber 100 comprises inner tube 112, top eyelet 120, outer tube 114, bottom eyelet 124, floating piston 130, valve block 174 and stationary tube 146. Top eyelet 120 comprises top mount 118 and top bolt throughhole 116, wherein top bolt throughhole 116 is disposed in top mount 118, and wherein top bolt throughhole 116 is adapted to receive a mounting bolt (not shown) for securing shock absorber 100 to the chassis (not shown) of a vehicle, as is known in the art. Top eyelet 120 further comprises top eyelet threads 184 and gas filling nipple port 194.

Inner tube 112 comprises side wall 140, first end 139 and head 141. First end 139 comprises inner tube threads 185, wherein inner tube threads 185 cooperatively engage with top eyelet threads 184, and wherein top seal 122 is disposed between top eyelet 120 and inner tube 112, thereby hermetically sealing top eyelet 120 to inner tube 112. Head 141 comprises seals 162, 164, 166, 168, wherein seals 162, 166 are disposed outward from head 141 in contact with outer tube 114, slidably sealing against outer tube 114, and wherein seals 164, 168 are disposed inward from head 141, and are disposed in contact with stationary tube 146, slidably sealing against stationary tube 146. Stationary tube 146 is of diameter selected to provide a desired flow between second and fourth fluid chambers 136 and 188 via third fluid chamber 144, and a desired pressure increase/decrease as stationary tube 146 enters/withdraws from second fluid chamber 136, wherein as stationary tube 146 enters second fluid chamber 136, floating piston 130 rises within inner tube 112, thereby increasing the pressure in first fluid chamber 190, and vice versa.

Head 141 separates upper side fluid chamber 160 and lower side fluid chamber 172, the former being formed between side wall 140 and outer tube 114 and the latter being enclosed by head 141, stationary tube 146, valve block 174 and outer tube 114.

As shock absorber 100 is compressed, fluid passes from second fluid chamber 136 into upper side fluid chamber 160 via piston tube holes 143. Concurrently, fluid passes from lower side fluid chamber 172 through valve block 174 into fourth fluid chamber 188. Fluid further passes from fourth fluid chamber 188 into third fluid chamber 144 within stationary tube 146 and on into second fluid chamber 136.

As shock absorber 100 expands, fluid passes from upper side fluid chamber 160 into second fluid chamber 136 via piston tube holes 143, flows into third fluid chamber 144, into fourth fluid chamber 188 and finally into lower side fluid chamber 172 via valve block 174.

Bottom eyelet 124 comprises, nipple port 195, bottom eyelet threads 187 and bottom mount 126, wherein bottom mount 126 has disposed therethrough, bottom bolt throughhole 128, and wherein bottom bolt throughhole 128 is adapted to receive a mounting bolt (not shown) for securing shock absorber 110 to the suspension (not shown) of a vehicle, as is known in the art. Nipple port 195 is adapted to receive a nipple, wherein nipple port 195 is in fluid communication with fourth fluid chamber 188 and provides for filling of shock absorber 100.

Outer tube 114 comprises side wall 145, second end 117 and outer tube cap 115, wherein outer tube cap 115 comprises seals 152, 154, 156 and 158, and wherein second end 117 comprises outer tube threads 186, and wherein outer tube threads 186 cooperatively engage bottom eyelet threads 187, and wherein bottom seal 182 is disposed between bottom eyelet 124 and outer tube 114, thereby hermetically sealing bottom eyelet 124 to outer tube 114.

Continuing to refer to FIGS. 2B, 4, 6A, 6B and 8, valve block 174 comprises dowel pins 175 and adjusters 177. Valve block 174 is secured to bottom eyelet 124 by dowel pins 175 and engagement with outer tube 114, wherein of bottom eyelet threads 187 cooperatively engage outer tube threads 186, and wherein fourth fluid chamber 188 is formed between valve block 174 and bottom eyelet 124.

Rotation of each of adjusters 177, 178 rotates their respective oblately-spheroid oblong plates 203, 204 to change the force holding cover plates 205, 206 to permit regulated adjustment of flow through valve block 174.

Figure 8:
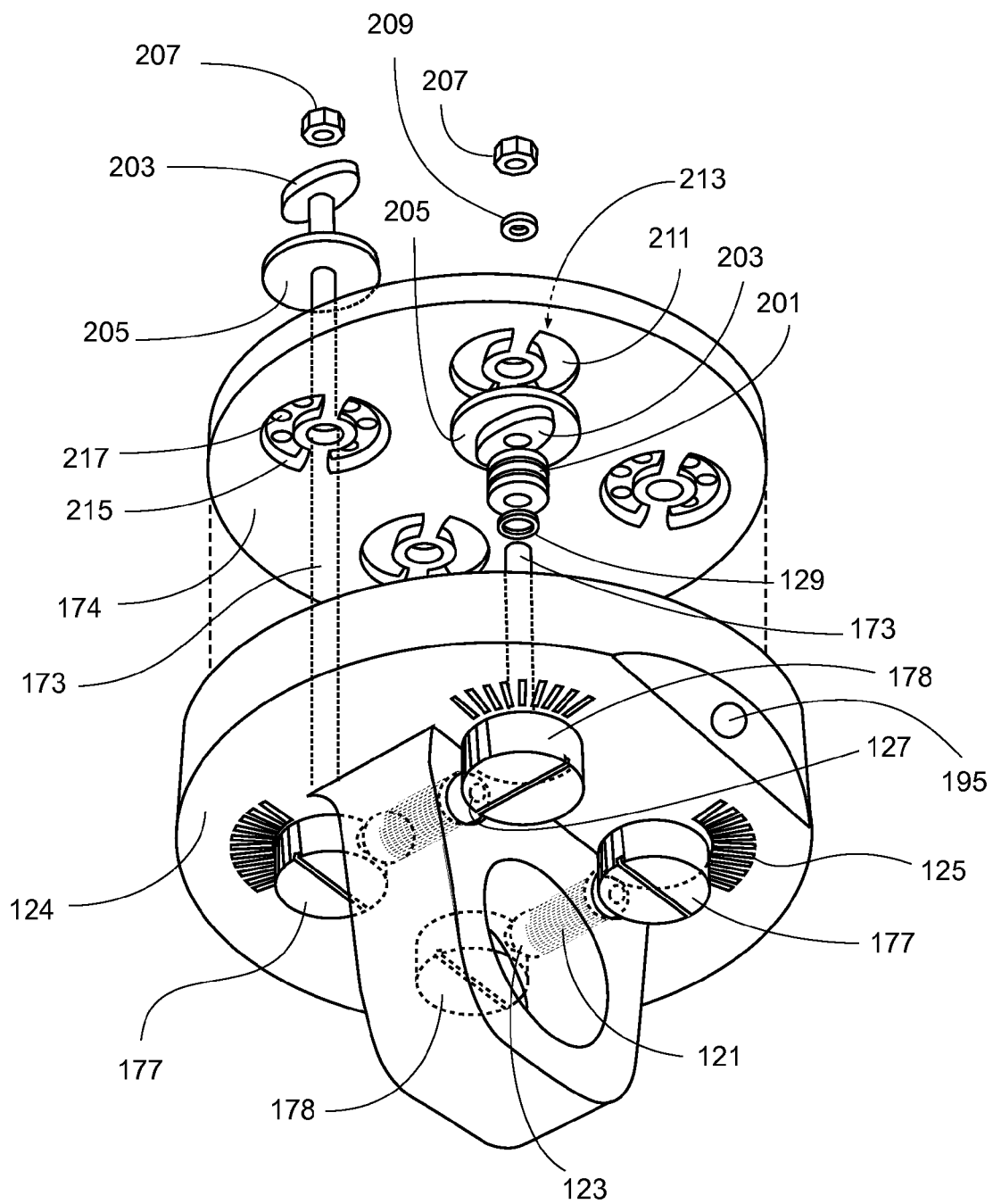
FIG. 8 is a bottom perspective view of an externally adjustable valve block according to the alternate embodiment of FIGS. 2A/2B.

Referring now more particularly to FIG. 8, valve block 174 comprises at least one compression exit 211 with at least one compression entrance 213 in fluid communication therewith. Valve block 174 further comprises at least one expansion opening 215 and at least one set of expansion holes 217 in communication therewith.

Valve block 174 is further secured to bottom eyelet 124 via adjusters 177, 178, wherein adjusters 177, 178 comprise shafts 173, and wherein shafts 173 carry thereon a plurality of retaining rings 129, spring disc assemblies 201, oblong plates 203, 204, cover plates 205, 206, spacers 209 and nuts 207. Rotation of adjusters 177, 178, respectively, change the flow through valve block 174 during compression and expansion.

Cover plate 205 is disposed over compression exit 211 or expansion holes 217, wherein oblong plate 203 is disposed outboard of cover plate 205 from compression exit 211 or expansion holes 217, and wherein oblong plate 203 is disposed against cover plate 205 when adjusters 177, 178, bottom eyelet 124 and valve block 174 are assembled. Spring disc assembly 201 and retaining ring 129 are disposed further outboard, wherein retaining ring 129 is disposed proximate bottom eyelet 124, and wherein spring disc assembly 201 applies pressure to oblong plate 203 holding same against cover plate 205.

Adjusters 177, 178 comprise detents 127 thereon and bottom eyelet 124 comprises indicia 125, springs 121 and ball bearings 123, wherein springs 121 apply pressure to ball bearings 123 forcing same into detents 127 in adjusters 177, 178, and wherein rotation of adjusters 177, 178 is restrained by pressure of ball bearings 123. Indicia 125 serve to provide a reference during rotation of adjusters 177, 178.

During compression of alternate embodiment shock absorber 100, fluid from third fluid chamber 144 is forced through valve block 174 into fourth fluid chamber 188, wherein fluid enters compression entrance 213 and passes through compression exit 211 forcing cover plate 205 to flex to permit fluid flow. Positioning of oblong plate 203 allows selective flow through compression exit 211, wherein oblong plate 203 may be selectively disposed such that oblong plate 203 allows full flex or partial flexing of cover plate 205. When full flex is desired, oblong plate 203 is disposed between compression exits 211, wherein when partial flexing of cover plate 205 is desired, oblong plate 203 is positioned over compression exits 211. It will be recognized by those skilled in the art that the size of compression exits 211 will also be determinative of flow.

During expansion of alternate embodiment shock absorber 100, fluid from fourth fluid chamber 188 is forced into expansion opening 215 and passes through expansion holes 217 forcing cover plate 206 to flex to permit fluid flow. Positioning of oblong plate 204 allows selective flow through expansion holes 217, wherein oblong plate 204 may be selectively disposed such that oblong plate 204 allows full flex or partial flexing of cover plate 206. When full flex is desired, oblong plate 204 is disposed between expansion holes 217 (and also between expansion openings 215), wherein when partial flexing of cover plate 205 is desired, oblong plate 204 is positioned over expansion holes 217. It will be recognized by those skilled in the art that the size of expansion holes 217 will also be determinative of flow.

Stationary tube 146 comprises first end 148, second end 150 and stationary tube threads 189 disposed at second end 150, wherein stationary tube threads 189 cooperatively engage valve block internal threads 191, thereby securing stationary tube 146 to valve block 174, wherein second end 150 is disposed proximate valve block 174.

Floating piston 130 comprises seals 132, 134, wherein seals 132, 134 are disposed in contact with inside of inner tube 112, thereby hermetically slidably sealing floating piston 130 to inner tube 112.

When shock absorber 100 is assembled, first fluid chamber 190 is formed between floating piston 130, inner tube 112 and top eyelet 120, wherein first fluid chamber 190 is subsequently filled with gas, such as, for exemplary purposes only, nitrogen, via a gas nipple disposed in nipple port 194 after shock absorber 100 is attached to a selected vehicle. Second fluid chamber 136 is formed between floating piston 130 and inner tube 112, wherein second fluid chamber 136 is filled during assembly with a suitable shock absorber fluid, such as, for exemplary purposes only, oil. Second fluid chamber 136 extends into extension chambers 170, and into stationary tube 146 forming third fluid chamber 144 therewithin.

Following is an example of a shock absorber design, drawing from the above preferred and selected alternate embodiments, and is not intended to limit the preferred and alternate embodiments:

EXAMPLE I

Process

Shock absorber 10 is first fully extended (inner tube 12 pulled all the way out) and floating piston 30 is set at its lowest position (just above piston tube holes 43). Shock absorber 10 is then filled with oil in all chambers below floating piston 30. First fluid chamber 90 is subsequently filled with nitrogen at an initial pressure ($P_i$). Shock absorber 10 is now pressurized. When an external force is applied (such as the weight of a vehicle) it will produce pressure ($P_v$) in second fluid chamber 36 below piston ring 41 which will act against first fluid chamber 90 pressure. This pressure differential ($dP=P_v-P_i$) will cause the inner tube 12 to move downwards. By doing so, oil is displaced against floating piston 30 causing it to move upwards, which in turn causes the pressure in the first fluid chamber 90 to increase. Inner tube 12 eventually stops when the pressure in first fluid chamber 90 equals the pressure in the second fluid chamber 36. The vehicle settles at a given ride height. Raising or lowering the $P_i$, changes the dP and accordingly the ride height.

"Spring Rate" Equivalent/Upper Reservoir

For example, a regular car spring requires 300 lbs to move one inch. Its spring rate is then 300 lbs/inch. First fluid chamber 90 is of fixed dimensions. When floating piston 30 moves up it reduces the volume of first fluid chamber 90 which in turn increases the pressure and vice versa. The amount by which the pressure will increase depends solely by the distance floating piston 30 moves into first fluid chamber 90. The distance by which floating piston 30 moves depends on the volume of oil displaced and by the volume of stationary tube 46 entering second fluid chamber 36. For example, shock absorber 10 is shortened by one inch. Floating piston 30 moves up and the pressure in first fluid chamber 90 increases by 1000 psi, which for a given chamber dimension equates to approximately 400 lbs of force. The "equivalent spring rate" is 400 lbs/in. By adding additional gas-containing chamber 333 (best shown in FIG. 9A) on top of the unit the nitrogen volume is increased. It will be recognized that additional gas containing chamber 333 could be utilized with the preferred and first alternate embodiments. This means that for the same amount of piston movement, the pressure increase will be less, resulting in 200 lbs of force, thus, reducing the "spring rate" to 200 lbs/in. External reservoir 311 has movable piston 332 thereinside which controls the chamber's volume. By positioning the piston at different heights in the reservoir, the volume is altered, and, in turn, the "spring rate" changes. Since the nitrogen pressure does not reduce in a linear fashion, the spring rate is effectively progressive.

Oil Displaced

The amount of oil being displaced depends on how far the piston tube moves.

1. As inner tube 12 moves down a given distance, the oil volume under floating head 41 is displaced, passing through controlled portion of valve block 74 into third fluid chamber 44, wherein the rate of movement is controlled by valve block 74 and stationary tube 46. As this is happening, upper side fluid chamber 60 expands above piston head 41 drawing excess into upper side fluid chamber 60, between inner tube 12 and outer tube 14. Part of the fluid volume displaced equal to the area between the OD of inner tube 12 and the ID of outer tube 14 will fill upper side fluid chamber 60 through inner tube 12 piston tube holes 43. The remaining oil volume displaced, defined as the area between inner tube 12 OD and stationary tube 46 OD ($V_o$), will act against floating piston 30 producing pressure P1.

2. As inner tube 12 moves down, stationary tube 46 enters second fluid chamber 36 the same distance (acting like a rod) causing a reduction in volume ($V_t$). This volume reduction produces an additional pressure, P2. The larger the diameter of stationary tube 46, the greater the P2 compared to P1.

Flow Constriction

The four piston tube holes 43 on inner tube 12 serve to constrict the flow especially during rebound and provide additional damping. As inner tube 12 extends upwards, piston tube holes 43 pass beyond outer tube cap 39 and gradually close the communication channel between upper side fluid chamber 60 and inner tube 12. It will be recognized by those skilled in the art that piston tube holes 43 may be selectively of different size, number and/or shape to provide a desired effect.

Hydraulic Lock

First fluid chamber 90 containing, for exemplary purposes only, nitrogen, must have sufficient volume to accommodate all the fluid being displaced ($V_o$ and $V_t$) for the entire stroke movement of shock absorber 10 to prevent hydraulic lock and damage to the shock. First fluid chamber 90 is selectively increased in size and/or by the addition of external nitrogen reservoir (best shown in FIG. 9A). The stroke movement depends on the application and varies.

Note: For the purposes of this example, the non-pressure-contributing oil volume in upper side fluid chambers 60, 160 is equal in both the preferred and first alternate embodiments since floating pistons 30, 130 comprise the same diameter.

Therefore, first fluid chambers 90, 190 are reduced in volume ($V_t$) by an amount equal to stationary tubes 46, 146, volume and the volume of the oil being displaced ($V_o$). The total pressure increase will be P3=P1+P2. The total volume reduction in first fluid chambers 90, 190 is the same for the preferred and first alternate embodiment, and so is P3. The preferred embodiment shock absorber 10 has a larger diameter stationary tube 46 and smaller $V_o$ than the stationary tube 146 of the first alternate embodiment shock absorber 100, which results in different pressure ratios for shock absorber 10 and shock absorber 100. Both units utilize valves blocks 74, 174 to control the oil displaced ($V_o$), wherein for the alternate embodiment, valve block 174 provides adjustment from the outside of shock absorber 100.

The preferred and first alternate embodiments both utilize nitrogen under pressure in first fluid chamber 90, 190, respectively, above the floating piston, to hold the vehicle up, thus replacing a conventional spring. During operation valve blocks 74, 174, respectively, regulate the flow of oil passing therethrough, providing the desired damping characteristics.

Figure 9A:
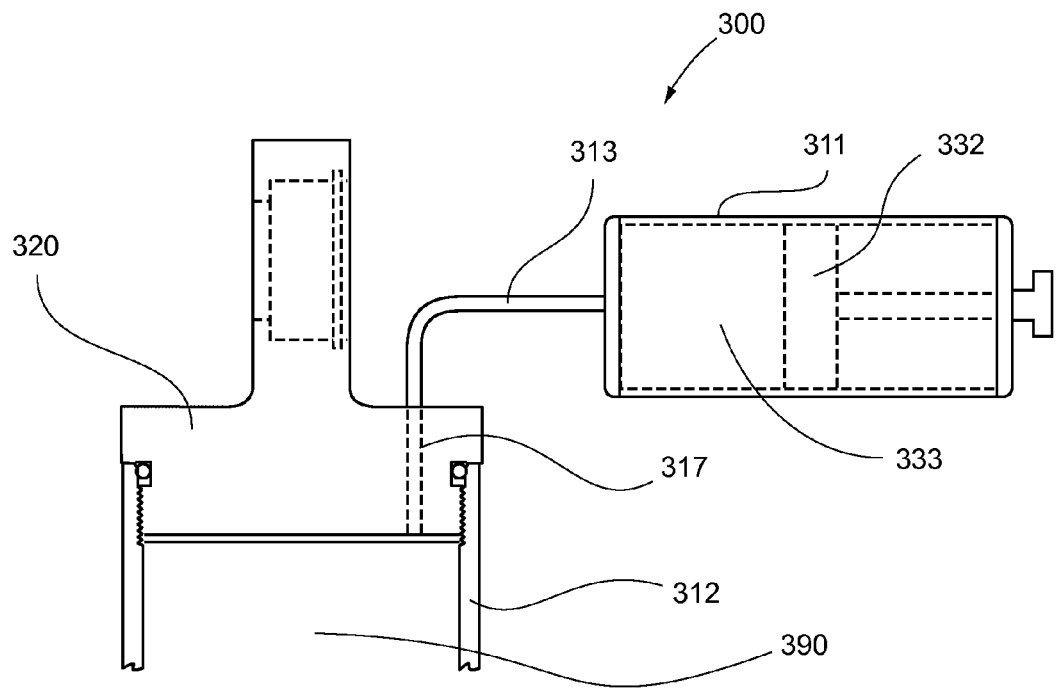
FIG. 9A is a side cross-sectional view of an external fluid reservoir in fluid communication with the upper gas chamber according to an alternate embodiment.

Referring now to FIG. 9A, illustrated therein is an alternate embodiment of shock absorber 10 or 100, wherein the alternate embodiment of FIG. 9A comprises shock absorber 300 having additional external reservoir 311 in fluid communication with first fluid chamber 390 within inner tube 312 via pipe 313, wherein pipe 313 passes through top eyelet 320 via channel 317 opening into first fluid chamber 390. External reservoir 311 comprises movable piston 332 and variable gas-containing chamber 333 therewithin.

Movement of movable piston 332 to reduce volume of gas, such as, for exemplary purposes only, nitrogen, in gas-containing chamber 333 increases gas pressure within first fluid chamber 390, thereby providing support for a vehicle of greater weight. Conversely, for lighter vehicles, movable piston 332 is operated to increase the volume of gas in gas-containing chamber 333, thereby reducing the pressure within first fluid chamber 390. That is, varying nitrogen volume has a direct effect on pressure and affects both original ride height and "effective spring rate".

Figure 9B:
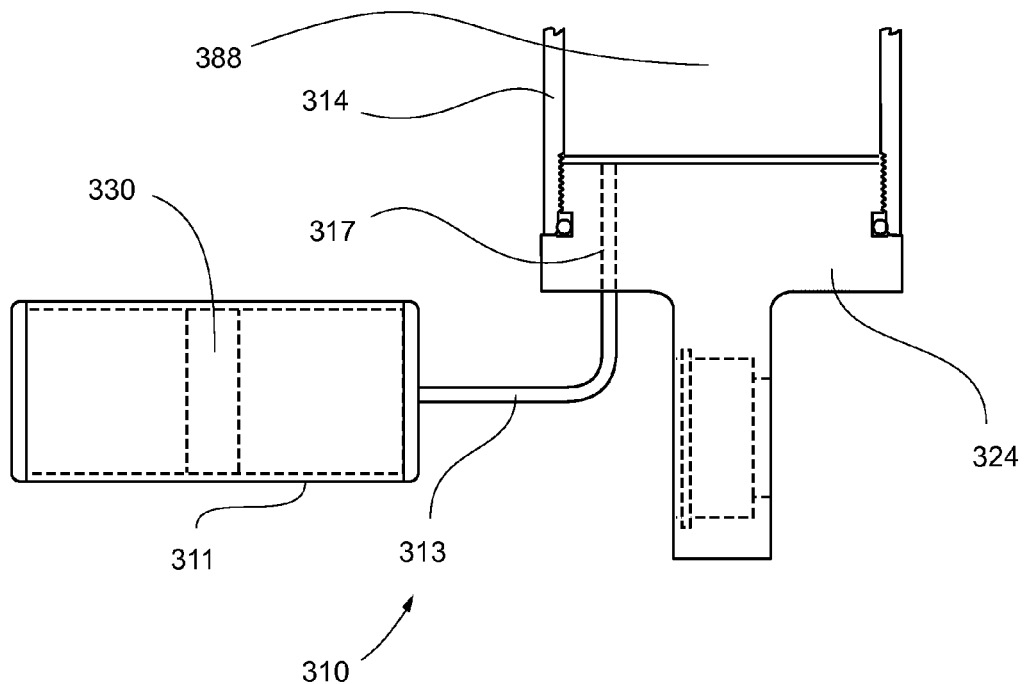
FIG. 9B is a side cross-sectional view of an external fluid reservoir in fluid communication with the lower oil chamber according to an alternate embodiment.

Referring now to FIG. 9B, illustrated therein is an alternate embodiment of shock absorber 10 or 110, wherein the alternate embodiment of FIG. 9B comprises shock absorber 310 with additional external reservoir 311 having floating piston 330 therewithin, wherein external reservoir 311 is in fluid communication via pipe 313 with fourth fluid chamber 388 within outer tube 314, wherein pipe 313 passes through bottom eyelet 324 opening into fourth fluid chamber 388, thereby reducing the amount of oil being displaced which is accommodated by expansion of first fluid chamber 90 ($V_o$) not shown). An oil volume ($V_w$) equal to the inner (piston) tube 12, 112 (best shown in FIGS. 1A and 2A) wall thickness as it enters the lower chamber is be displaced into external reservoir 311. Thus, for the same given inner (piston) tube 12, 112 movement, an oil volume equal to ($V_o$-$V_w$) is displaced, acting against the volume in the first fluid chamber, thereby reducing P1.

Figure 10:
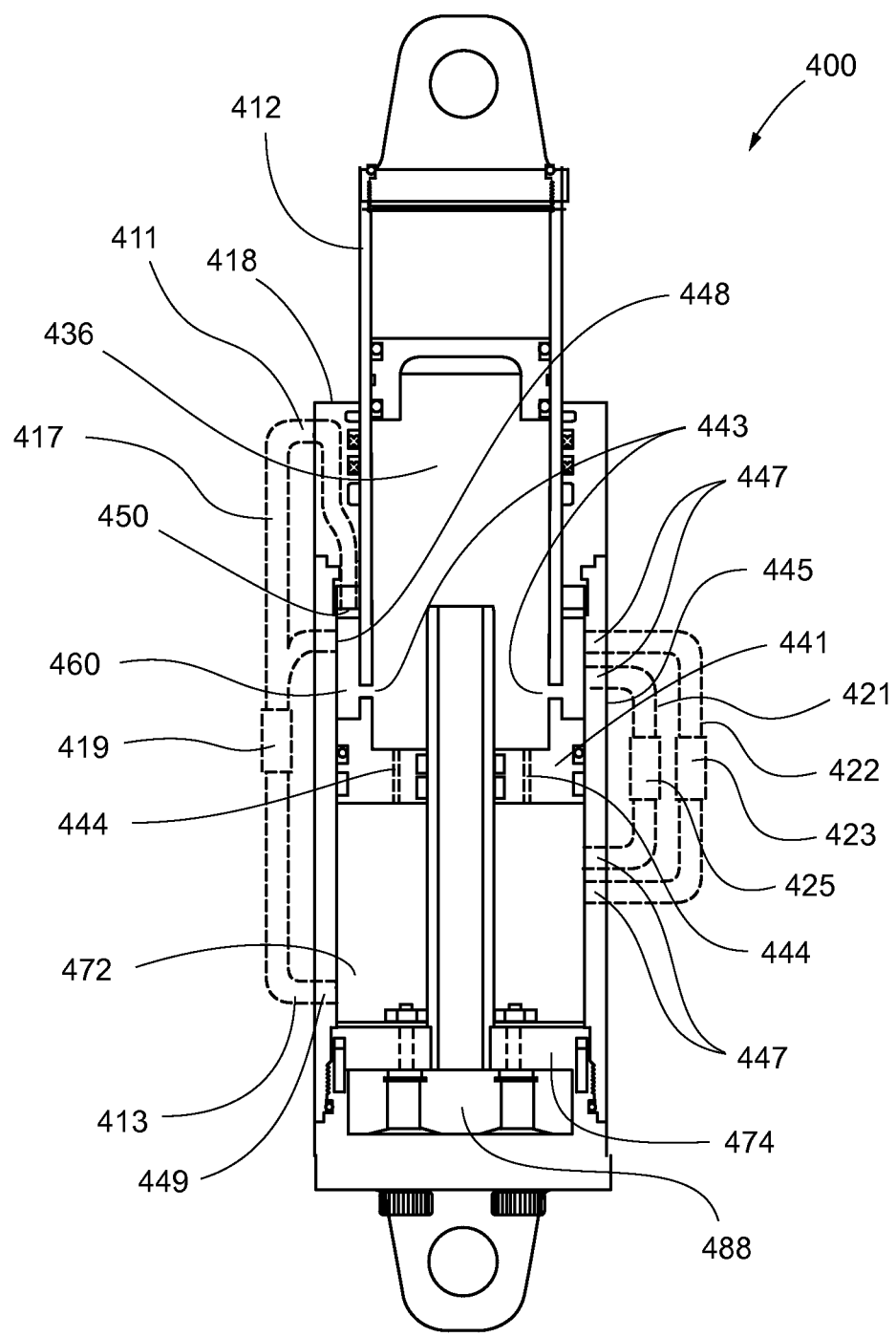
FIG. 10 is a side cross-sectional view of two alternative external equilibration systems according to an alternate embodiment.

Referring now to FIG. 10, illustrated therein is an alternate embodiment of shock absorber 100, wherein the alternate embodiment of FIG. 10 is shock absorber 400 having bleed valves 444 to accommodate very small inner (piston) tube 412 movement, thereby bypassing valve block 474. It will be recognized by those skilled in the art that bleed valves, such as bleed valves 444, could be utilized with the preferred and first alternate embodiments hereinabove. Further, small holes 443 allow direct flow exchange between second fluid chamber 436 and upper side fluid chamber 460, as with the preferred and first alternate embodiments. One or more external bypass tubes 417, 421, 422 can also be located between side fluid chambers 472 and 460 to accommodate slow speed movement. Bypass tube 417 comprises first end 411 and second end 413, wherein first end 411 passes through outer tube side wall 445 exiting into upper side fluid chamber 460 via aperture 448, and wherein second end 413 opens into lower side fluid chamber 472 via aperture 449. Alternatively, first end 411 could pass through first end 418 of outer tube 414 exiting into upper fluid chamber 460 via opening 450. Bypass tubes 421 and 422 similarly communicate with upper side fluid chamber 460 and lower side fluid chamber 472 via holes 447. Bypass tubes 417, 421 and 422 may selectively have respective control valves 419 (bidirectional), 425 (one way), 423 (one way) to regulate flow in either direction.

Figure 11:
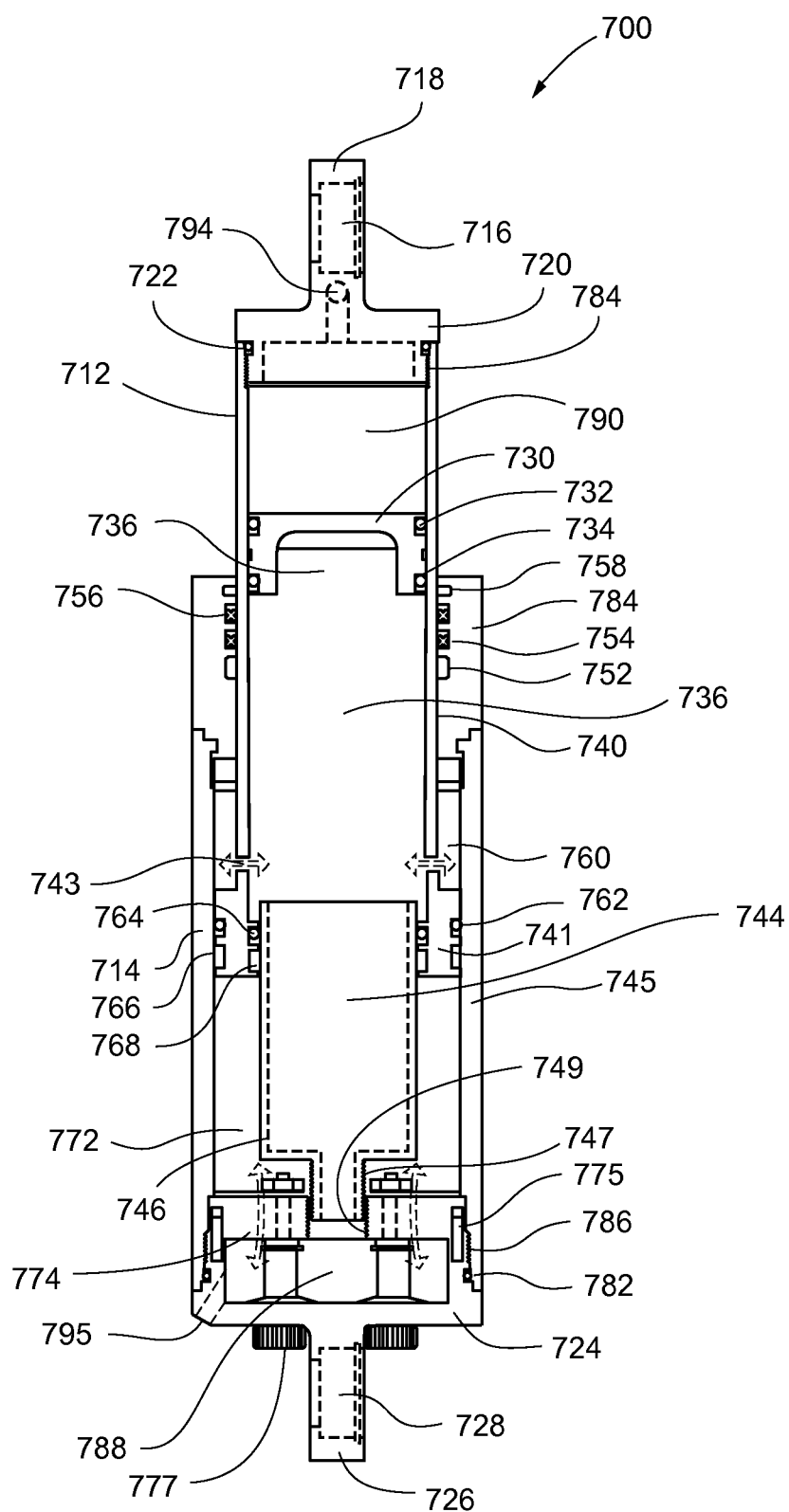
FIG. 11 is a side cross-sectional view of an alternate embodiment combination of the preferred embodiment of FIGS. 1A/1B and the alternate embodiment of FIGS. 2A/2B.

In yet another alternate embodiment depicted in FIG. 11, wherein the alternate embodiment of FIG. 11 is similar in form and function to both the preferred and alternate embodiments depicted in FIGS. 1A-2B, except as noted hereinbelow, shock absorber 700 comprises top eyelet 720 having top mount 718 with top mount throughhole 716 therewithin, inner tube 712, outer tube 714, and bottom eyelet 724 having bottom mount 726 with bottom mount throughhole 728 therewithin. Top eyelet 720 is secured to inner tube 712 via cooperatively-engaging threads 784, wherein top eyelet 720 is sealed to inner tube 712 via seal 722. Top eyelet further comprises gas nipple 794, wherein gas nipple 794 is utilized for filling shock absorber 700 with gas before or subsequent to installation on a vehicle.

Shock absorber 700 further comprises first fluid chamber 790, second fluid chamber 736, third fluid chamber 744, fourth fluid chamber 788, upper side fluid chamber 760 and lower side fluid chamber 772.

Disposed within inner tube 712 is floating piston 730, wherein floating piston 730 is slidably sealed to inner tube 712 via seals 732, 734. and wherein floating piston 730 separates first fluid chamber 790, which typically comprises, for exemplary purposes only, a gas therewithin, from second fluid chamber 736 which typically comprises, for exemplary purposes only, oil therewithin.

Bottom eyelet 724 is secured to outer tube 714 via cooperatively-engaging threads 786 and is sealed to outer tube 714 via seal 782. Bottom eyelet 724 further comprises nipple receiver 795, wherein nipple receiver 795 is in fluid communication with fourth fluid chamber 788. Valve block 774 is disposed within outer tube 714 and is secured within shock absorber 700 via dowel pins 775 and via installation and securing of bottom eyelet 724 to outer tube 714. Valve block 774 comprises internal threads 749, adjusters 777.

Shock absorber 700 further comprises stationary tube 746, wherein stationary tube 746 comprises threads 747, and wherein threads 747 cooperatively engage internal threads 749 of valve block 774 to selective interchange different size combinations of stationary tube 746 and inner tube 712.

Inner tube 712 is slidably engaged to outer tube 714 and to stationary tube 746, wherein seals 752, 754, 756, 758 seal inner tube 712 to top cap 784 of outer tube 714. Inner tube 712 further comprises side wall 740 and head 741, wherein head 741 is slidably sealed to side wall 745 of outer tube 714 via seals 762, 766 and to stationary tube 746 via seals 764, 768. Inner tube 712 further comprises openings 743, wherein openings 743 facilitate fluid communication between second fluid chamber 736 and upper side fluid chamber 760 through sidewall 740 of inner tube 712.

It will be recognized by those skilled in the art that various combinations of the preferred and alternate embodiments may selectively be utilized, wherein features of one embodiment may be incorporated into another embodiment via similar structural components.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A springless shock absorbing and suspension apparatus comprising:
    an inner tubular section comprising a first fluid chamber and a second fluid chamber therewithin, wherein said first fluid chamber contains gas and wherein said second fluid chamber contains oil;
    a floating piston disposed within said inner tubular section between said first fluid chamber and said second fluid chamber;
    an outer tubular section having a first and second end, wherein the first end of the outer tubular section is at least partially disposed around at least a portion of the inner tubular section, wherein said outer tubular section comprises a fourth fluid chamber therewithin that contains oil;
    a valve block fixedly secured to the second end of the outer tubular section;
    a stationary tubular section disposed within the outer tubular section, the stationary tubular section fixedly secured to the valve block, the stationary tubular section having a third fluid chamber therewithin;
    wherein the second fluid chamber is in fluid communication with an upper side fluid chamber through a first flow path extending axially in a tubular space disposed between a radially external surface of the stationary tubular section and a radially internal surface of the inner tubular section, wherein the upper side fluid chamber is concentrically defined by a radially external surface of the inner tubular section and a radially internal surface of the outer tubular section; and
    wherein the fourth fluid chamber is in fluid communication with a lower side fluid chamber through a second flow path extending through an unrestricted opening in the valve block, wherein the lower side fluid chamber is defined between a top surface of the valve block and a bottom surface on an end of the inner tubular section.

2. The springless shock absorbing and suspension apparatus of claim 1, wherein said valve block comprises a two-way valve.

3. The springless shock absorbing and suspension apparatus of claim 1, wherein said inner tubular section is slidably disposed within a portion of said outer tubular section.

4. The springless shock absorbing and suspension apparatus of claim 1, wherein said third fluid chamber is in fluid communication with said fourth fluid chamber via said valve block.

5. The springless shock absorbing and suspension apparatus of claim 1, further comprising an external gas-containing chamber in communication with said first fluid chamber, wherein said external gas-containing chamber comprises a controllable piston therewithin.

6. The springless shock absorbing and suspension apparatus of claim 1, further comprising an external fluid chamber in fluid communication with said fourth fluid chamber, wherein said external fluid chamber comprises a liquid fluid section, a gaseous fluid section and a floating piston therebetween.

7. The springless shock absorbing and suspension apparatus of claim 1, wherein the floating piston further comprises an extended chamber that extends the first fluid chamber therewithin; the extended chamber having side walls and an end that extend into and are at least partially disposed within the stationary tubular section.

8. The springless shock absorbing and suspension apparatus of claim 7 further comprising a plug adjustably disposed within the extended chamber, the adjustable plug subdividing the first fluid chamber into a lower expansion section on one side the adjustable plug and the remainder of the first fluid chamber on the other side of the adjustable plug.

9. The springless shock absorbing and suspension apparatus of claim 8 wherein the adjustable plug is threadedly engaged with the side walls of the extended chamber.

10. The springless shock absorbing and suspension apparatus of claim 1, wherein the first flow path further extends through a radial opening in a longitudinal side wall of the inner tubular section.

11. The springless shock absorbing and suspension apparatus of claim 10, wherein the radial opening is disposed in a head end of the longitudinal side wall of the inner tubular section.

12. A springless shock absorber comprising:
a telescoping tube assembly comprising an inner tubular section and an outer tubular section telescopically and concentrically configured about at least a portion of the inner tubular section;
a floating piston disposed within said inner tubular section, the floating piston separating a gas filled chamber within one end of the inner tubular section and a plurality of oil-filled chambers disposed within another of the telescoping tube assembly,
wherein the outer tubular section comprises a valve block fixedly secured thereto;
a stationary tubular section fixedly secured to the valve block, the stationary tubular section being concentrically and radially disposed internal to the outer tubular section; and
wherein the oil-filled chambers further comprising at least,
a first oil-filled chamber disposed within a combination of interior portions of the inner tubular section and the outer tubular section, the first oil-filled chamber in fluid communication with an upper side oil-filled chamber through a first flow path extending axially in a tubular space disposed between a radially external surface of the stationary tubular section and a radially internal surface of the inner tubular section, wherein the upper side fluid chamber is concentrically defined by a radially external surface of the inner tubular section and a radially internal surface of the outer tubular section, and
a second oil-filled chamber disposed within the outer tube section and not disposed within the inner tube section, the second oil-filled chamber in fluid communication with a lower side oil-filled chamber through a second flow path extending through an unrestricted opening of the valve block, wherein the lower side fluid chamber is defined between a top surface of the valve block and a bottom surface on an end of the inner tubular section.

13. The shock absorber of claim 12, further comprising an extended gas-containing chamber within said floating piston.

14. The shock absorber of claim 13, further comprising a threaded plug within said extended gas-containing chamber.

15. The springless shock absorber of claim 12, wherein the first flow path further extends through a radial opening in a longitudinal side wall of the inner tubular section.

16. A method of operating a springless shock absorber having a telescoping tube assembly with an inner tube section, an outer tube section, and a stationary tube section, a floating piston that divides the interior of the inner tube section into a gas-filled chamber and one of a plurality of fluid-filled chambers within the telescoping tube assembly, and a valve block assembly fixed to the outer tube section and the stationary tube section, the method comprising the steps of:
moving the inner tube section relative to the outer tube section while the stationary tube section remains fixed relative to the outer tube section in order to compress the telescoping tube assembly;
in response to compressing the telescoping tube assembly, reducing the volume of the gas-filled chamber to generate spring-like forces within the telescoping tube assembly to carry a desired load by the springless shock absorber; and
also in response to compressing the telescoping tube assembly,
increasing the volume of an upper side fluid-filled chamber of the plurality of fluid-filled chambers, the upper side fluid-filled chamber being concentrically defined between a radially external surface of the inner tube section and a radially internal surface of the outer tube section of the telescoping tube assembly, the upper side fluid-filled chamber being in fluid communication with the one of the plurality of fluid-filled chambers next to the floating piston through a first flow path extending axially between a radially external surface of the stationary tubular section and a radially internal surface of the inner tubular section;
decreasing the volume of a lower side fluid-filled chamber of the plurality of fluid-filled chambers, the lower side fluid-filled chamber being defined between at least the radially internal surface of the outer tube section, the radially external surface of the stationary tube section, a head end surface of the inner tube section, and a top surface of the valve block assembly;
wherein the lower side fluid-filled chamber being in fluid communication with another of the plurality of fluid-filled chambers through a second flow path extending through an unrestricted opening of the valve block assembly, the another of the fluid-filled chambers disposed within the outer tube section and not disposed within the inner tube section; and
wherein the respective steps of increasing the volume of the upper side fluid-filled chamber and decreasing the volume of the lower side fluid-filled chamber causes fluid to move through the first flow path and the second flow path to provide the resistive dampening force.

17. The method of claim 16, wherein the first flow path further extends through a radial opening in a longitudinal side wall of the inner tube section.

18. A springless shock absorber, comprising:
a telescoping tube assembly comprising an inner tube section and an outer tube section;
a gas-filled chamber disposed within one end of the telescoping tube assembly;
a plurality of oil-filled chambers disposed within another end of the telescoping tube assembly, the oil-filled chambers further comprising at least,
a first oil-filled chamber disposed within a combination of interior portions of the inner tube section and the outer tube section, the first oil-filled chamber in fluid communication with an upper side oil-filled chamber through a first flow path,
a second oil-filled chamber disposed within the outer tube section and not disposed within the inner tube section, the second oil-filled chamber in fluid communication with a lower side oil-filled chamber through a second flow path;

a floating piston disposed within the telescoping tube assembly, wherein the floating piston movably seals and separates the gas-filled chamber and the first oil-filled chamber;

a valve block fixedly coupled to the another end of the telescoping tube assembly, the valve block providing at least one restricted flow opening that fluidly couples the first oil-filled chamber to the second oil-filled chamber;

a stationary tube section disposed within the outer tube section attached to the valve block, the stationary tube section being concentrically and radially disposed internal to the outer tube section, wherein the first flow path extends axially in a concentrically defined tubular space disposed between a radially external surface of the stationary tube section and a radially internal surface of the inner tube section, wherein the upper side fluid chamber is concentrically defined by a radially external surface of the inner tube section and a radially internal surface of the outer tube section, wherein the second flow path extends through an unrestricted opening of the valve block, wherein the lower side fluid chamber is defined between a top surface of the valve block and a bottom surface on an end of the inner tube section; and wherein as the telescoping tube assembly changes from an expanded configuration to a compressed configuration, the volume of the gas-filled chamber reduces to generate spring-like forces within the telescopic tube assembly to support a desired load on the telescopic tube assembly, and the volume of the upper side oil-filled chamber increases while substantially simultaneously the lower side oil-filled chamber decreases causing oil to move through at least the restricted flow opening in the valve block to provide a dampening force on movement of the telescopic tube assembly.

19. The springless shock absorber of claim 18, wherein the at least one restricted flow opening in the valve block comprises a through hole and at least one plate that abuts the through hole, the at least one plate having a flow resistance characteristic related to a desired flow resistance associated with the at least one restricted flow opening in the valve block.

20. The springless shock absorber of claim 19, wherein the flow resistance characteristic is associated with a desired range of pressure values during operation of the springless shock absorber, and is further related to at least one plate characteristic from the following group of plate characteristics comprising plate stiffness, plate thickness, plate diameter, and how many plates make up the at least one plate.

21. The springless shock absorber of claim 19, wherein the telescoping tube assembly further comprises a concentric assembly of (1) the inner tube section, (2) the outer tube section coupled to the valve block and that articulates with respect to the inner tube section, and (3) the stationary tube section fixed relative to the outer tube section.

22. The springless shock absorber of claim 21, wherein the first oil-filled chamber is in fluid communication with the upper side oil-filled chamber through at least one restrictive opening in the inner tube section and a restrictive diameter distance between the inner tube section and the stationary tube section.

23. The springless shock absorber of claim 18, wherein the first flow path further extends through at least one radial aperture through a longitudinal side wall of the inner tube section.

* * * * *